(12) United States Patent
Kinoshita

(10) Patent No.: US 11,975,758 B2
(45) Date of Patent: May 7, 2024

(54) DRIVING SUPPORT SYSTEM

(71) Applicant: TOYOTA JIDOSHA KABUSHIKI KAISHA, Toyota (JP)

(72) Inventor: Toshiki Kinoshita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 368 days.

(21) Appl. No.: 17/473,368

(22) Filed: Sep. 13, 2021

(65) Prior Publication Data

US 2022/0161852 A1 May 26, 2022

(30) Foreign Application Priority Data

Nov. 24, 2020 (JP) .................................. 2020-194494

(51) Int. Cl.
*B62D 15/02* (2006.01)

(52) U.S. Cl.
CPC ................. *B62D 15/0265* (2013.01)

(58) Field of Classification Search
CPC . B62D 15/0265; B62D 15/025; B60W 30/09; B60W 40/02
USPC .......................................................... 701/41
See application file for complete search history.

(56) References Cited

U.S. PATENT DOCUMENTS

| | | | |
|---|---|---|---|
| 2011/0187515 A1* | 8/2011 | Saito ................ | B60W 30/0956 701/1 |
| 2018/0348770 A1 | 12/2018 | Yasui | |
| 2020/0385017 A1* | 12/2020 | Baba ............... | B60W 30/18163 |

FOREIGN PATENT DOCUMENTS

| | | |
|---|---|---|
| JP | 2010070069 A | 4/2010 |
| JP | 2018-203034 A | 12/2018 |
| JP | 2020185946 A | 11/2020 |

* cited by examiner

*Primary Examiner* — Scott A Reinbold
(74) *Attorney, Agent, or Firm* — Dinsmore & Shohl LLP

(57) ABSTRACT

A first risk potential field for a risk avoidance control is a sum of a risk potential field in which a valley of a risk value extends in a lane longitudinal direction and a risk potential field in which the risk value is maximum at a position of an object and decreases as a distance from the object increases. The steering control is executed such that a vehicle approaches a first minimum point that is a minimum point of the first risk potential field and that is searched for in a first search range. When a plurality of first minimum point candidates is present in the first search range, the first minimum point candidate that is present in a direction away from a foremost object as viewed from a previous minimum point and is the closest to the previous minimum point is selected as the current first minimum point.

5 Claims, 24 Drawing Sheets

FIG. 24
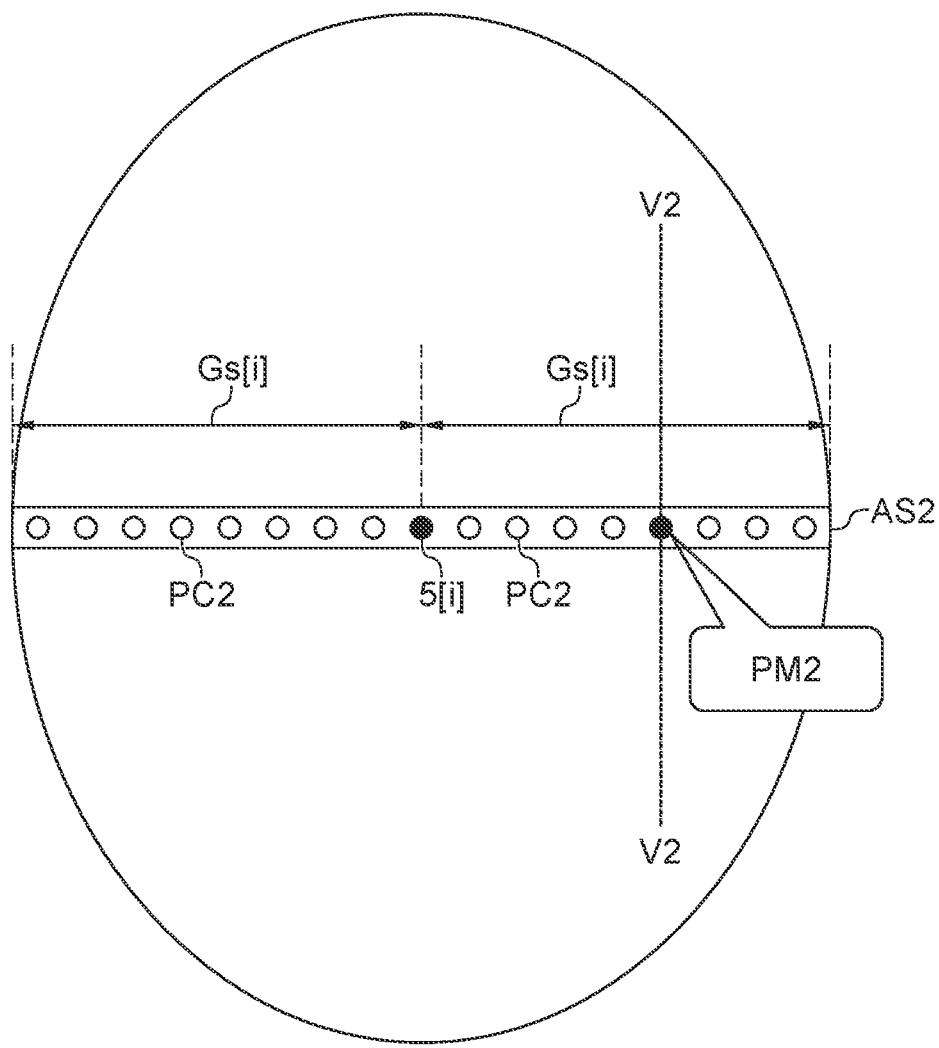
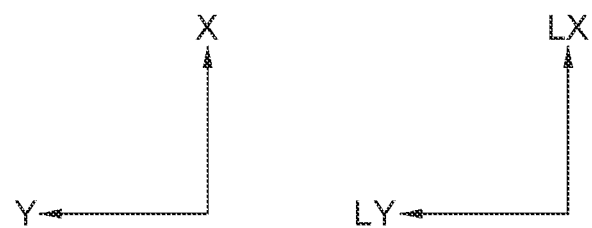

DRIVING SUPPORT SYSTEM

CROSS-REFERENCE TO RELATED APPLICATION

This application claims priority to Japanese Patent Application No. 2020-194494 filed on Nov. 24, 2020, incorporated herein by reference in its entirety.

BACKGROUND

1. Technical Field

The present disclosure relates to a driving support control that supports driving of a vehicle. In particular, the present disclosure relates to a risk avoidance control for reducing the risk of collision with an object in front of the vehicle.

2. Description of Related Art

Japanese Unexamined Patent Application Publication No. 2018-203034 (JP 2018-203034 A) discloses a traveling path determination device for determining a traveling path of a vehicle. The traveling path determination device determines the traveling path of the vehicle using a risk potential region and a benefit potential region. The risk potential region represents a region in which there may be obstacles such as pedestrians and other vehicles. The benefit potential region represents an ideal travel region in which the vehicle should travel. This benefit potential region is set based on the driving data of skilled drivers.

SUMMARY

A "risk avoidance control" for reducing the risk of collision with an object in front of the vehicle will be discussed. In particular, a risk avoidance control based on a risk potential field will be discussed. The risk potential field expresses a risk value related to traveling of a vehicle as a function of position. The risk avoidance control is realized by executing a vehicle travel control such that the vehicle follows a "valley" of the risk potential field.

More specifically, a process of searching for the minimum point of the risk potential field in a predetermined search range is repeatedly executed. The "valley" of the risk potential field corresponds to a set of temporally continuous minimum points. Here, there is a possibility that a plurality of minimum point candidates is found in the search range. When an inappropriate minimum point candidate is selected from the minimum point candidates as the minimum point, an inappropriate risk avoidance control is to be executed. Occupants of the vehicle feel uncomfortable with the inappropriate risk avoidance control.

One object of the present disclosure is to provide a technique capable of suppressing a sense of discomfort against the risk avoidance control based on the risk potential field.

A first aspect of the present disclosure relates to a driving support system that supports driving of a vehicle. The driving support system includes: a storage device that stores driving environment information indicating a driving environment of the vehicle; and a processor that executes a risk avoidance control for reducing a risk of collision with an object in front of the vehicle, based on the driving environment information. A risk potential field represents a risk value as a function of position. A vertical potential field is the risk potential field in which a valley of the risk value extends in a lane longitudinal direction. An obstacle potential field is the risk potential field in which the risk value is maximum at a position of the object and decreases as a distance from the object increases. The risk avoidance control includes a steering control for steering the vehicle. A first risk potential field for the steering control is a sum of the vertical potential field and the obstacle potential field. The processor is configured to repeatedly executes a process of setting the first risk potential field based on the driving environment information, a search process of searching for a first minimum point that is a minimum point of the first risk potential field in a first search range that intersects a traveling direction of the vehicle, and the steering control for steering the vehicle so as to approach the first minimum point. A previous minimum point is the first minimum point in a previous cycle. A foremost object is the object that is present in front of the vehicle and is the closest to the vehicle. When a plurality of candidates for the first minimum point is present in the first search range, the processor selects, as a current first minimum point, the candidate that is present in a direction away from the foremost object as viewed from the previous minimum point and is the closest to the previous minimum point.

According to the present disclosure, the first risk potential field is applied to the steering control of the risk avoidance control. The first risk potential field is the sum of the vertical potential field and the obstacle potential field. The steering control is executed such that the vehicle approaches the first minimum point that is the minimum point of the first risk potential field. The first minimum point is searched for in a first search range. When the first minimum point candidates are present in the first search range, the first minimum point candidate that is present in the direction away from the foremost object as viewed from the previous minimum point and is the closest to the previous minimum point is selected as the current first minimum point. As a result, an inappropriate steering control and an excessive steering control are suppressed. That is, it is possible to suppress a sense of discomfort with respect to the risk avoidance control (steering control) based on the first risk potential field.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 24 is a conceptual diagram illustrating the deceleration control according to the embodiment of the present disclosure.

DETAILED DESCRIPTION OF EMBODIMENTS

An embodiment of the present disclosure will be described with reference to the accompanying drawings.

1. Driving Support System 1-1. Overview

Figure 1:
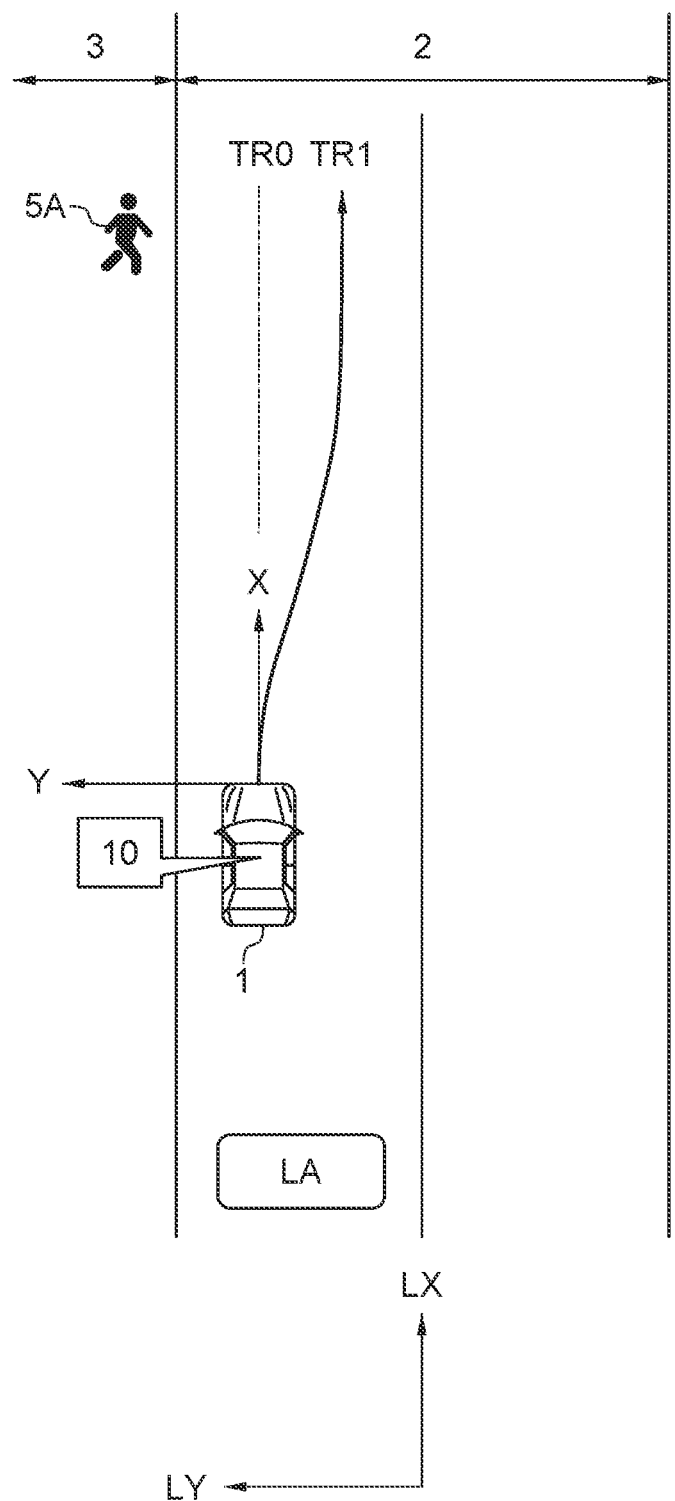
FIG. 1 is a conceptual diagram illustrating an overview of a driving support system according to an embodiment of the present disclosure.

FIG. 1 is a conceptual diagram illustrating an overview of a driving support system 10 according to the present embodiment. The driving support system 10 executes a "driving support control" that supports driving of a vehicle 1. The driving support control may be included in an autonomous driving control. Typically, the driving support system 10 is mounted on the vehicle 1. Alternatively, at least a part of the driving support system 10 may be disposed in an external device outside the vehicle 1 to execute the driving support control remotely. That is, the driving support system 10 may be dispersedly disposed in the vehicle 1 and the external device.

The driving support control includes a "risk avoidance control" that avoids a risk in front of the vehicle 1 in advance. More specifically, the driving support system 10 recognizes an object 5 in front of the vehicle 1. Then, the driving support system 10 executes a risk avoidance control in order to reduce (avoid) the risk of collision with the object 5 in advance. Such a risk avoidance control includes at least one of a steering control for steering the vehicle 1 and a deceleration control for decelerating the vehicle 1.

For example, in FIG. 1, the vehicle 1 is traveling in a lane LA in a roadway 2. A pedestrian 5A is present in a roadside region 3 (road shoulder, roadside band, sidewalk, etc.) adjacent to the roadway 2. The pedestrian 5A may enter the lane LA. Thus, the pedestrian 5A who is present in the roadside region 3 is a risk for the vehicle 1. The driving support system 10 executes a risk avoidance control as necessary in order to reduce the risk of collision with the pedestrian 5A. For example, the driving support system 10 automatically steers the vehicle 1 in a direction away from the pedestrian 5A. In FIG. 1, a trajectory TR0 represents a trajectory of the vehicle 1 when the risk avoidance control is not executed. On the other hand, a trajectory TR1 represents a trajectory of the vehicle 1 when the risk avoidance control is executed.

The pedestrian 5A may be replaced by a bicycle or a two-wheeled vehicle. Further, pedestrians, bicycles, two-wheeled vehicles, preceding vehicles, etc. present in the roadway 2, besides the roadside region 3, are the subjects of the risk avoidance control.

Figure 2:
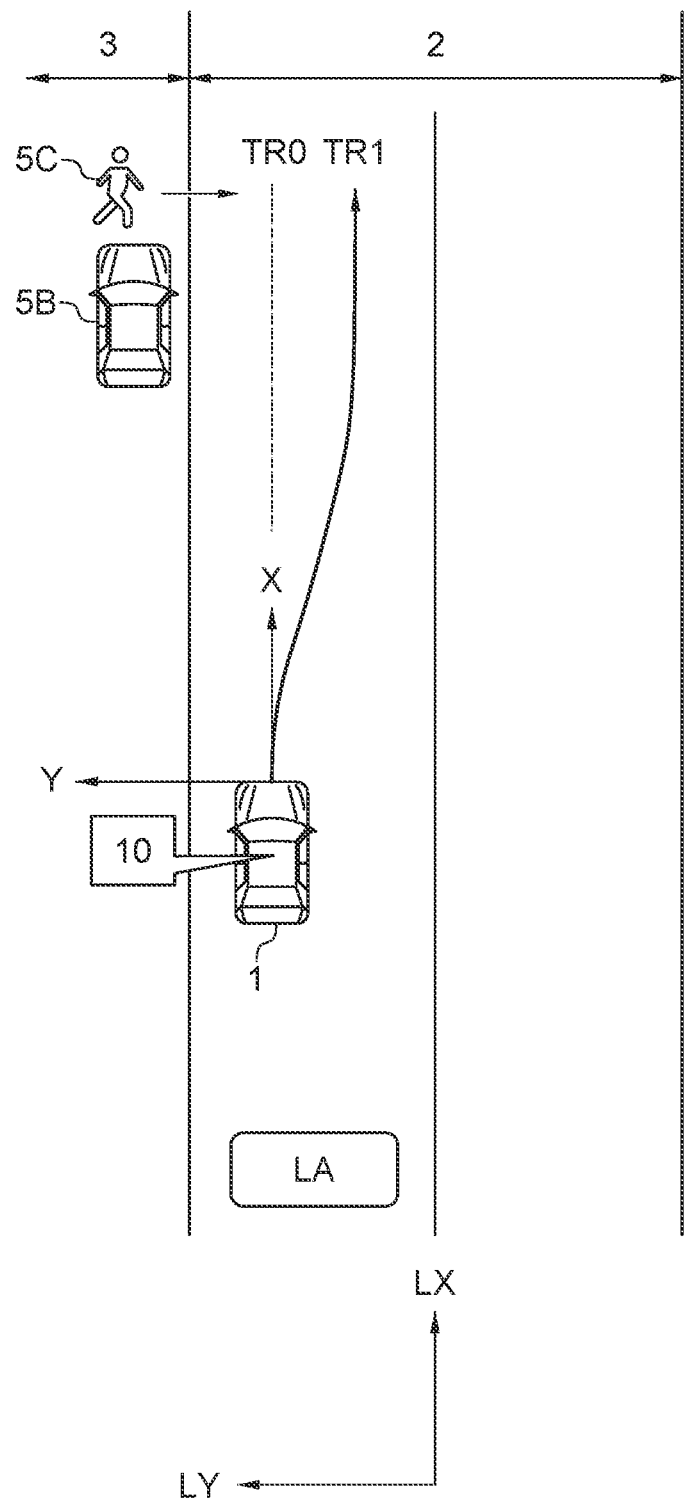
FIG. 2 is a conceptual diagram illustrating an example of a risk avoidance control according to the embodiment of the present disclosure.

FIG. 2 is a conceptual diagram illustrating another example of the risk avoidance control. The subject of the risk avoidance control is not limited to an "explicit risk" such as the above-mentioned pedestrian 5A, but may also include a "potential risk". For example, in FIG. 2, there is a parked vehicle 5B in the roadside region 3 in front of the vehicle 1. The region beyond the parked vehicle 5B is a blind spot, from which the pedestrian 5C may pop out. Thus, the parked vehicle 5B in front of the vehicle 1 is a risk for the vehicle 1 and is the subject of the risk avoidance control. For example, the driving support system 10 automatically steers the vehicle 1 in a direction away from the parked vehicle 5B.

As described above, the object 5 that is the subject of the risk avoidance control includes at least one of pedestrians, bicycles, two-wheeled vehicles, and other vehicles in front of the vehicle 1.

Here, a coordinate system and directions will be defined. The vehicle coordinate system (X, Y) is a relative coordinate system fixed to the vehicle 1, and changes with the movement of the vehicle 1. The X direction is a forward direction (traveling direction) of the vehicle 1. The Y direction is a lateral direction of the vehicle 1. The X direction and the Y direction are orthogonal to each other. The LX direction (lane longitudinal direction) is a direction in which the lane LA extends. The LY direction (lane width direction) is a width direction of the lane LA. The LX direction and the LY direction are orthogonal to each other. The longitudinal distance is a distance in the X direction or the LX direction. The lateral distance is a distance in the Y direction or the LY direction.

1-2. Configuration Example

Figure 3:
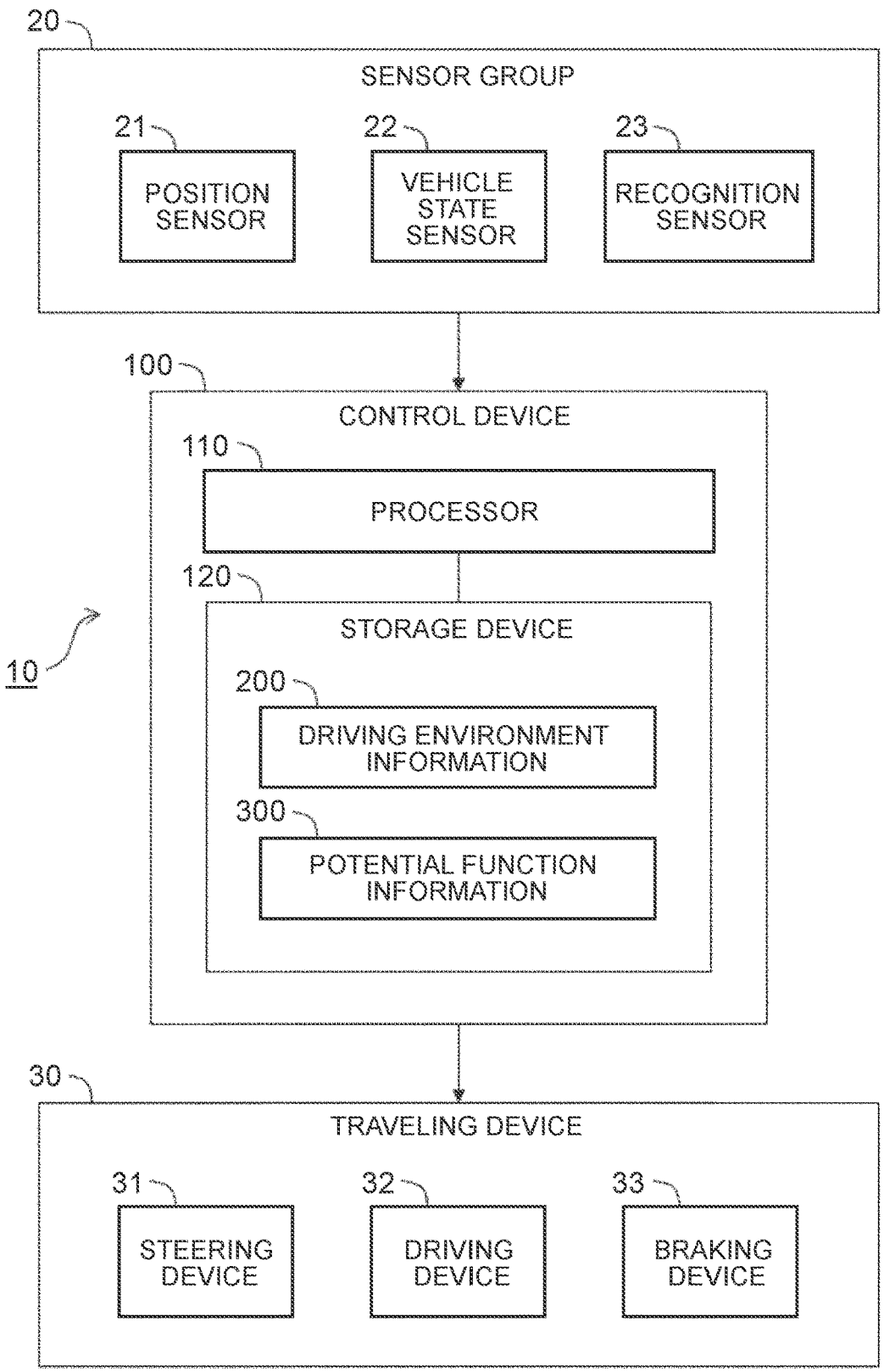
FIG. 3 is a block diagram showing a configuration example of a vehicle and the driving support system according to the embodiment of the present disclosure.

FIG. 3 is a block diagram schematically showing a configuration example of the vehicle 1 and the driving support system 10 according to the present embodiment. In particular, FIG. 3 shows a configuration example related to the risk avoidance control. The vehicle 1 includes a sensor group 20 and a traveling device 30.

The sensor group 20 includes a position sensor 21, a vehicle state sensor 22, and a recognition sensor 23. The position sensor 21 detects the position and the orientation of the vehicle 1 in the absolute coordinate system. Examples of the position sensor 21 include a Global Positioning System (GPS) sensor. The vehicle state sensor 22 detects the state of the vehicle 1. Examples of the vehicle state sensor 22 include a vehicle speed sensor, a yaw rate sensor, a lateral acceleration sensor, a steering angle sensor, and the like. The recognition sensor 23 recognizes (detects) the situation around the vehicle 1. Examples of the recognition sensor 23 include a camera, a radar, a laser imaging detection and ranging (LIDAR), and the like.

The traveling device 30 includes a steering device 31, a driving device 32, and a braking device 33. The steering device 31 steers the wheels of the vehicle 1. For example, the steering device 31 includes a power steering (electric power steering (EPS)) device. The driving device 32 is a driving power source that generates a driving force. Examples of the driving device 32 include an engine, an electric motor, an in-wheel motor, and the like. The braking device 33 generates a braking force.

The driving support system 10 includes at least a control device 100. The driving support system 10 may include the sensor group 20. The driving support system 10 may include the traveling device 30.

The control device 100 controls the vehicle 1. Typically, the control device 100 is a microcomputer mounted on the vehicle 1. The control device 100 is also referred to an electronic control unit (ECU). Alternatively, the control device 100 may be an information processing device outside the vehicle 1. In that case, the control device 100 communicates with the vehicle 1 and controls the vehicle 1 remotely.

The control device 100 includes a processor 110 and a storage device 120. The processor 110 executes various processes. Various types of information are stored in the storage device 120. Examples of the storage device 120 include a volatile memory, a non-volatile memory, and the like. When the processor 110 executes a control program that is a computer program, various processes executed by the processor 110 (control device 100) are realized. The control program is stored in the storage device 120 or recorded on a computer-readable recording medium.

1-3. Information Acquisition Process

The processor 110 (control device 100) executes an "information acquisition process" for acquiring driving environment information 200 indicating the driving environment of the vehicle 1. The driving environment information 200 is acquired based on the detection results of the sensor group 20 mounted on the vehicle 1. The acquired driving environment information 200 is stored in the storage device 120.

Figure 4:
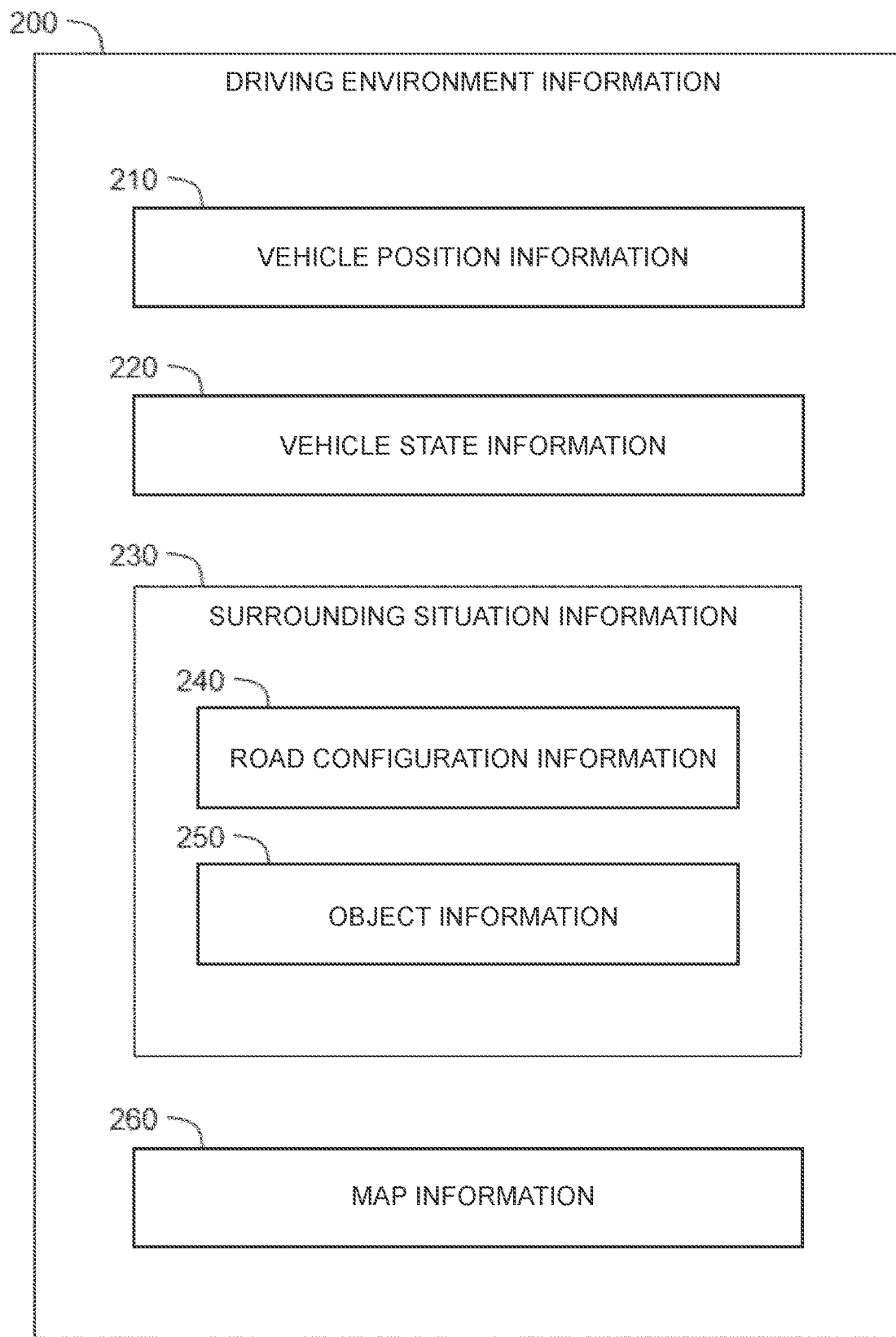
FIG. 4 is a block diagram showing an example of driving environment information according to the embodiment of the present disclosure.

FIG. 4 is a block diagram showing an example of the driving environment information 200. The driving environment information 200 includes vehicle position information 210, vehicle state information 220, surrounding situation information 230, map information 260, and the like.

The vehicle position information 210 is information indicating the position and the orientation of the vehicle 1 in the absolute coordinate system. The processor 110 acquires the vehicle position information 210 from the detection result of the position sensor 21.

The vehicle state information 220 is information indicating the state of the vehicle 1. Examples of the state of the vehicle 1 include a vehicle speed, a yaw rate, a lateral acceleration, a steering angle, and the like. The processor 110 acquires the vehicle state information 220 from the detection result of the vehicle state sensor 22.

The surrounding situation information 230 is information indicating the surrounding situation of the vehicle 1. The surrounding situation information 230 includes the information obtained by the recognition sensor 23. For example, the surrounding situation information 230 includes image information indicating the surrounding situation of the vehicle 1 captured by the camera. As another example, the surrounding situation information 230 includes measurement information measured by the radar or the LIDAR. Further, the surrounding situation information 230 includes road configuration information 240 and object information 250.

The road configuration information 240 is information regarding the road configuration around the vehicle 1. The road configuration around the vehicle 1 includes lane markings (white lines) and road edge objects. The road edge objects are three-dimensional obstacles that indicate the edge of the road. Examples of the road edge objects include curbs, guardrails, walls, median strips, and the like. The road configuration information 240 indicates at least the positions of the lane markings and the road edge objects (positions relative to the vehicle 1).

For example, by analyzing the image information obtained by the camera, the lane marking can be identified and the relative position of the lane marking can be calculated. Examples of the image analysis method include a semantic segmentation and an edge detection. Similarly, by analyzing the image information, the road edge object can be identified and the relative position of the road edge object can be calculated. Alternatively, the relative position of the road edge object can be acquired from radar measurement information.

The object information 250 is information regarding the object 5 around the vehicle 1. Examples of the object 5 include pedestrians, bicycles, two-wheeled vehicles, other vehicles (preceding vehicles, parked vehicles), and the like. The object information 250 indicates the relative position and the relative speed of the object with respect to the vehicle 1. For example, by analyzing the image information obtained by the camera, the object 5 can be identified and the relative position of the object 5 can be calculated. It is also possible to identify the object 5 and acquire the relative position and the relative speed of the object 5 based on the radar measurement information. The object information 250 may include the moving direction and the moving speed of the object 5. The moving direction and the moving speed of the object 5 can be calculated by tracking the position of the object 5. The object information 250 may indicate the type of the object 5 (pedestrian, bicycle, two-wheeled vehicle, other vehicle, etc.).

The map information 260 indicates a lane arrangement, a road shape, and the like. The control device 100 acquires the map information 260 of the required area from a map database. The map database may be stored in a predetermined storage device mounted on the vehicle 1, or may be stored in a management server outside the vehicle 1. In the latter case, the processor 110 communicates with the management server to acquire the necessary map information 260.

1-4. Vehicle Travel Control

The processor 110 (control device 100) executes a "vehicle travel control" that controls the traveling of the vehicle 1. The vehicle travel control includes a steering control for controlling the steering of the vehicle 1, an acceleration control for controlling the acceleration of the vehicle 1, and a deceleration control for controlling the deceleration of the vehicle 1. The processor 110 executes the vehicle travel control by controlling the traveling device 30. Specifically, the processor 110 executes the steering control by controlling the steering device 31. Further, the processor 110 executes the acceleration control by controlling the driving device 32. Further, the control device 100 executes the deceleration control by controlling the braking device 33.

1-5. Risk Avoidance Control

The processor 110 (control device 100) executes a driving support control that supports the driving of the vehicle 1. The driving support control includes a risk avoidance control. The risk avoidance control is a vehicle travel control for reducing (avoiding) the risk of collision with the object 5 in front of the vehicle 1, and includes at least one of the steering control and the deceleration control. The processor 110 executes the risk avoidance control based on the above-mentioned driving environment information 200.

Hereinafter, the risk avoidance control according to the present embodiment will be described in more detail.

2. Risk Potential Field

A "risk value R (risk potential)" is introduced as a value representing the risk related to the traveling of the vehicle. The risk value R is defined for each position. The position where the risk value R is high is a position where the vehicle 1 should avoid. A "risk potential field U" represents the risk value R as a function of position. In other words, the risk potential field U shows the distribution of the risk value R.

The "position" may be a position in the vehicle coordinate system (X, Y) or a position in the absolute coordinate system (latitude, longitude). Coordinate conversion between the absolute coordinate system and the vehicle coordinate system is possible based on the vehicle position information 210. In the following description, the position in the vehicle coordinate system and the position in the absolute coordinate system are treated as equivalent.

The risk avoidance control (steering control, deceleration control) according to the present embodiment is executed based on the risk potential field U. The components of the risk potential field U will be described below.

2-1. Obstacle Potential Field

Figure 5:
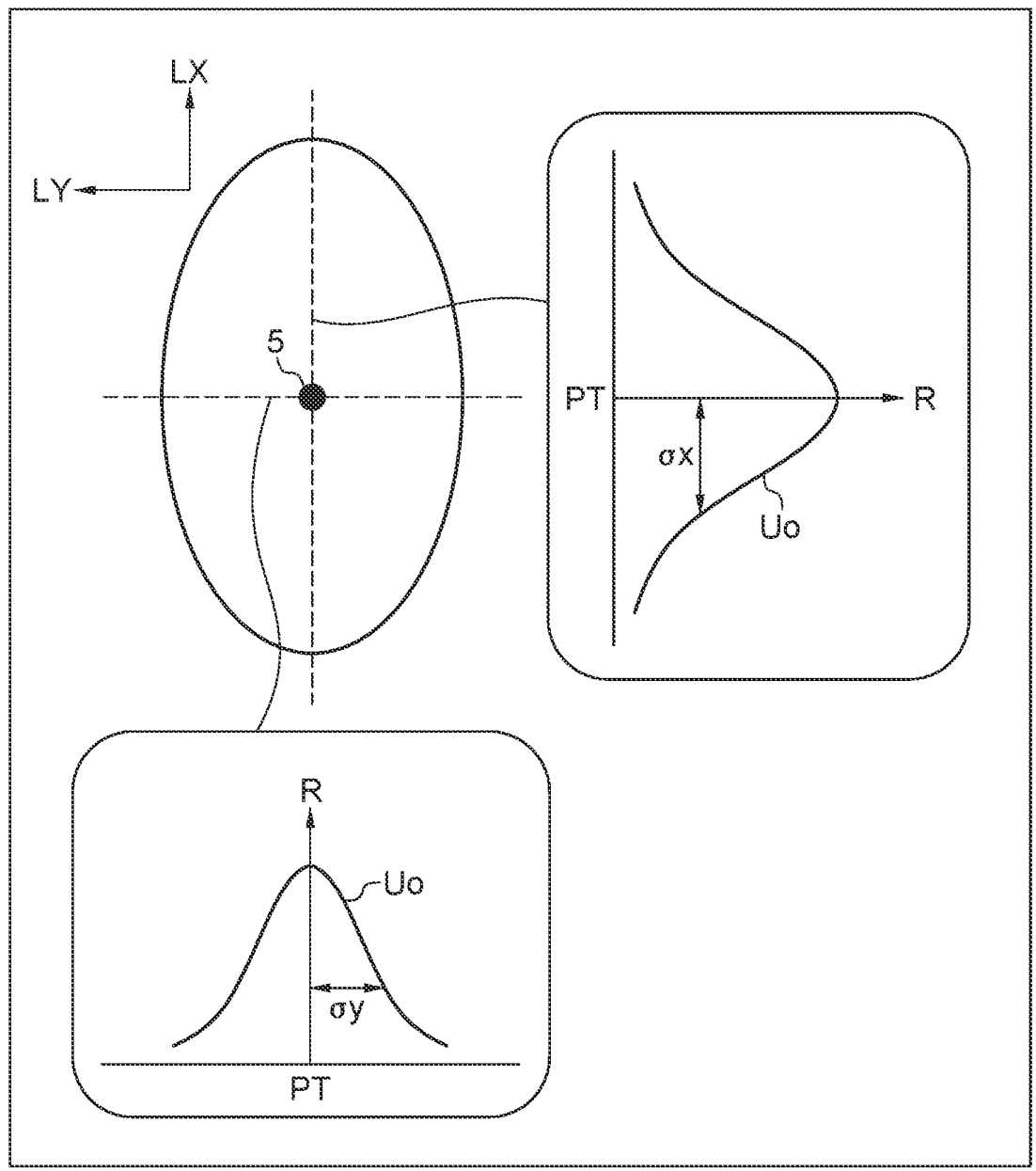
FIG. 5 is a conceptual diagram illustrating an obstacle potential field according to the embodiment of the present disclosure.

FIG. 5 is a conceptual diagram illustrating an obstacle potential field Uo. The obstacle potential field Uo is a risk potential field U for restraining the vehicle 1 from approaching the object 5. Thus, the risk value R indicated by the obstacle potential field Uo becomes maximum at the position of the object 5, and decreases as the distance from the object 5 increases.

More specifically, the obstacle potential field Uo shows a two-dimensional distribution of the risk value R. FIG. 5 shows a profile of the distribution along each of the two main axis directions. The two main axis directions are the LX direction (lane longitudinal direction) and the LY direction (lane width direction). As another example, the two main axis directions may be the X direction and the Y direction. An object position PT is the position of the object 5. In each main axis direction, the risk value R becomes maximum at the object position PT and decreases as the distance from the object position PT increases. That is, the distribution of the risk value R has a mountain shape.

An obstacle potential function fo is a distribution function showing the distribution of the risk value R of the obstacle potential field Uo. For example, the obstacle potential function fo is a Gaussian function. In that case, the distribution is represented by a Gaussian distribution (normal distribution). The distribution parameters σx and σy are parameters respectively indicating the degree of spread of the distribution in the two main axis directions. When the distribution is a Gaussian distribution, the distribution parameters σx and σy are standard deviations.

The distribution parameters σx and σy may be different for each type of the object 5. For example, the distribution parameters σx and σy in the case where the object 5 is a pedestrian are larger than those in the case where the object 5 is another vehicle.

The distribution parameters σx and σy may vary depending on the vehicle speed of the vehicle 1. For example, as the vehicle speed increases, the distribution parameters σx and σy increase. In this case, the distribution parameters σx and σy are given in the map.

Potential function information 300 (see FIG. 3) indicates the obstacle potential function fo and the distribution parameters σx and σy. The potential function information 300 is generated in advance and stored in the storage device 120.

The processor 110 sets the obstacle potential field Uo related to the object 5. The position and the type of the object 5 can be obtained from the object information 250. The arrangement of the lane LA is obtained from the road configuration information 240 or the map information 260. The LX direction and the LY direction are obtained from the arrangement of the lane LA. The vehicle speed is obtained from the vehicle state information 220. Thus, the processor 110 can set the obstacle potential field Uo related to the object 5 based on the driving environment information 200 and the potential function information 300.

2-2. Vehicle Center Potential Field

Figure 6:
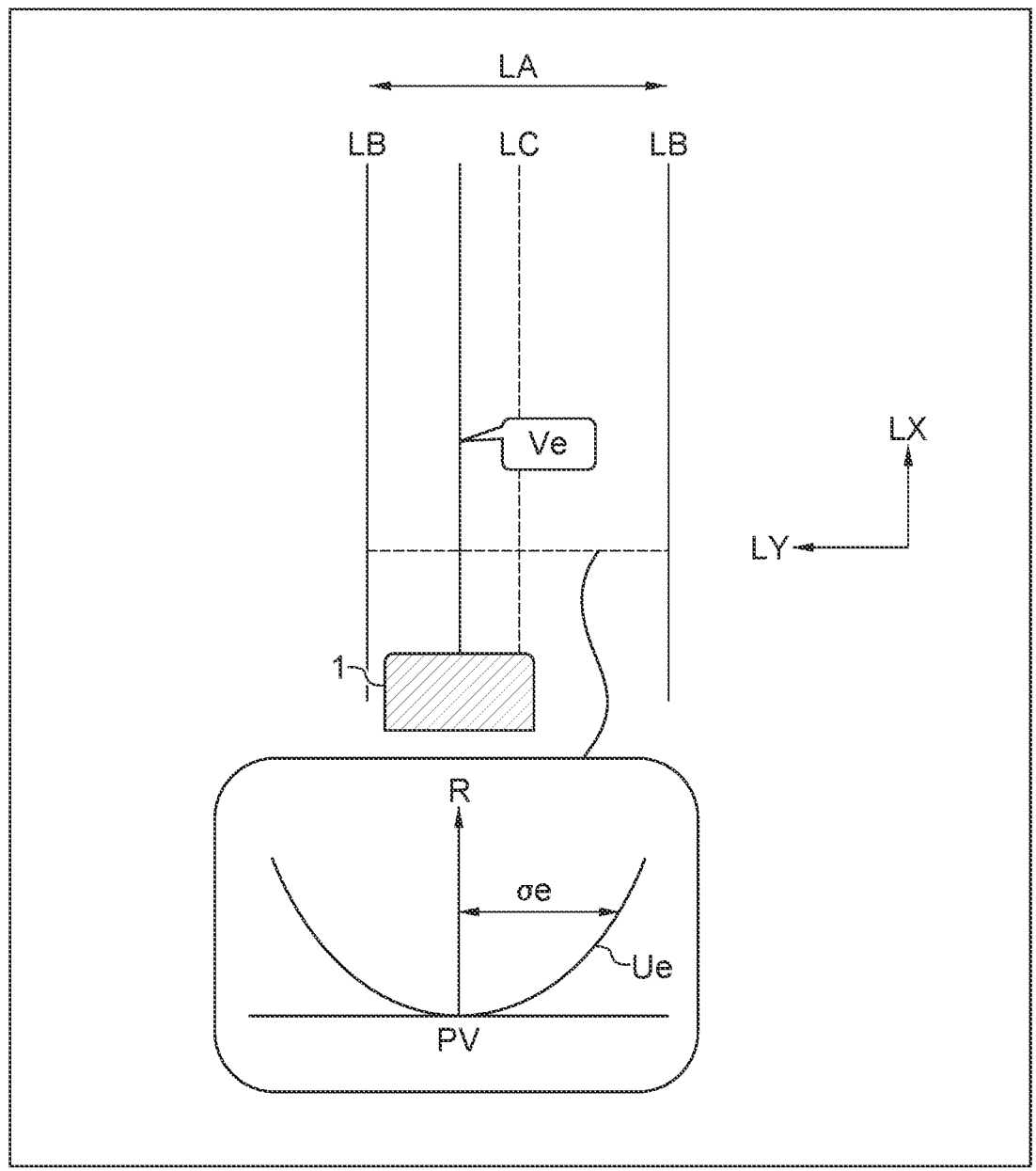
FIG. 6 is a conceptual diagram illustrating a vehicle center potential field according to the embodiment of the present disclosure.

FIG. 6 is a conceptual diagram illustrating a vehicle center potential field Ue. The lane LA in which the vehicle 1 is present is a region interposed between the right and left lane boundaries LBs (lane markings). The lane LA and the lane boundaries LB extend in the LX direction (lane longitudinal direction). The vehicle center potential field Ue is a risk potential field U for the vehicle 1 to travel along the lane LA. Thus, a "valley Ve" of the risk value R indicated by the vehicle center potential field Ue extends in the LX direction.

More specifically, the vehicle center potential field Ue shows a two-dimensional distribution of the risk value R. FIG. 6 shows a profile of the distribution along the LY direction (lane width direction). The vehicle lateral position PV is the position of the vehicle 1 in the LY direction. In the LY direction, the risk value R is the smallest at the vehicle lateral position PV and increases as the distance from the vehicle lateral position PV increases. That is, the distribution of the risk value has a U-shape. The position of the valley Ve of the risk value R coincides with the vehicle lateral position PV. The valley Ve extends in the LX direction from the position of the vehicle 1. That is, the position of the valley Ve is not fixed and dynamically changes in conjunction with the position of the vehicle 1.

A vehicle center potential function fe is a distribution function showing the distribution of the risk value R of the vehicle center potential field Ue. For example, the vehicle center potential function fe is a quadratic curve. The distribution parameter σe is a parameter indicating the degree of spread of the distribution. The potential function information 300 (see FIG. 3) further indicates the vehicle center potential functions fe and the distribution parameter σe.

The processor 110 sets the vehicle center potential field Ue. The position of the vehicle 1 is obtained from the vehicle position information 210. The arrangement of the lane LA is obtained from the road configuration information 240 or the map information 260. The LX direction and the LY direction are obtained from the arrangement of the lane LA. Thus, the processor 110 can set the vehicle center potential field Ue based on the driving environment information 200 and the potential function information 300.

2-3. Lane Center Potential Field

Figure 7:
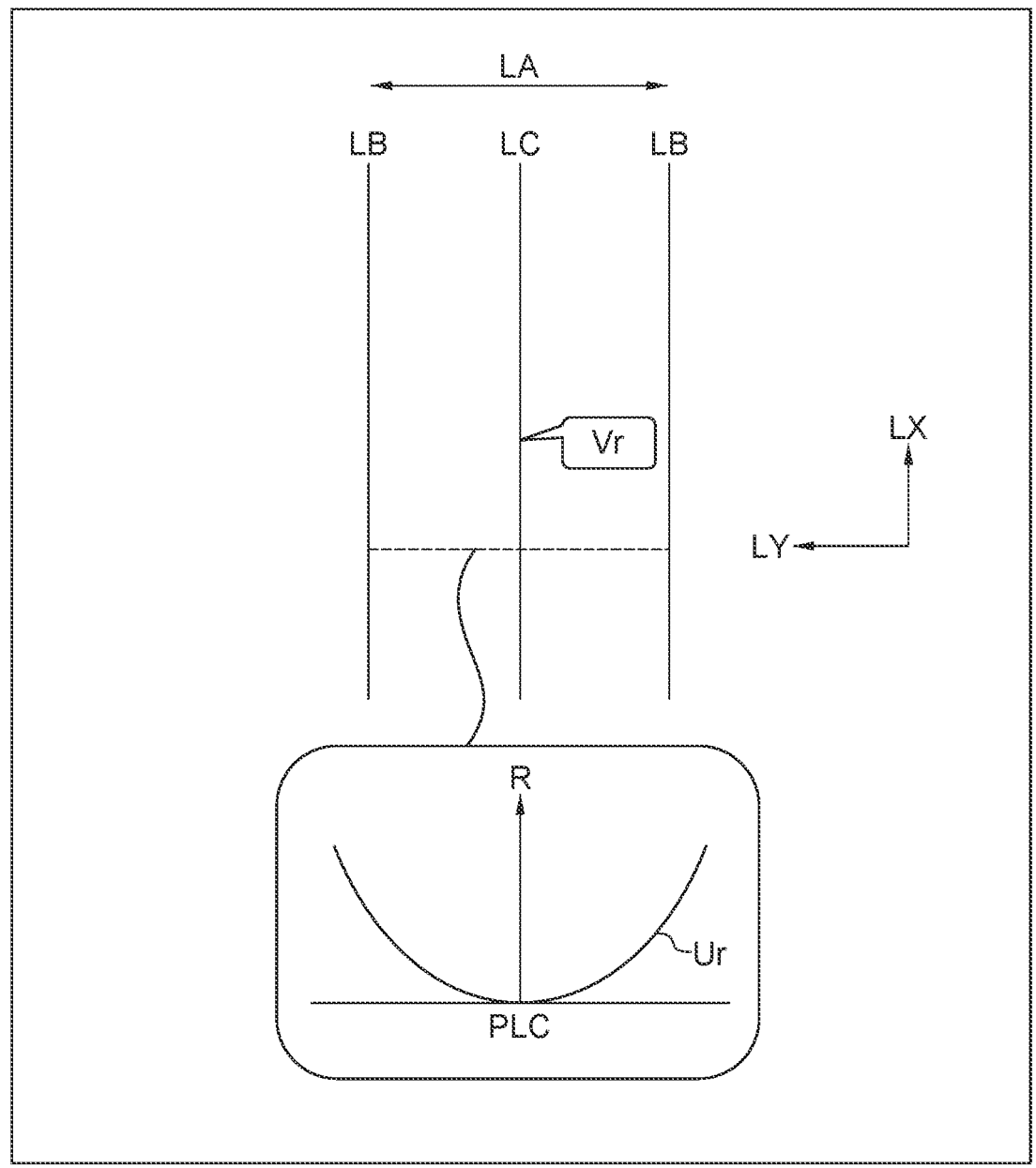
FIG. 7 is a conceptual diagram illustrating a lane center potential field used in a comparative example.

FIG. 7 shows a lane center potential field Ur. The lane center potential field Ur is a risk potential field U for the vehicle 1 to travel along a lane center LC. The "valley Vr" of the risk value R indicated by the lane center potential field Ur also extends in the LX direction. However, the position of the valley Vr is fixed to a lane center position PLC (the position of the lane center LC). That is, the position of the valley Vr of the lane center potential field Ur is fixed to the lane LA and does not change dynamically.

Figure 8:
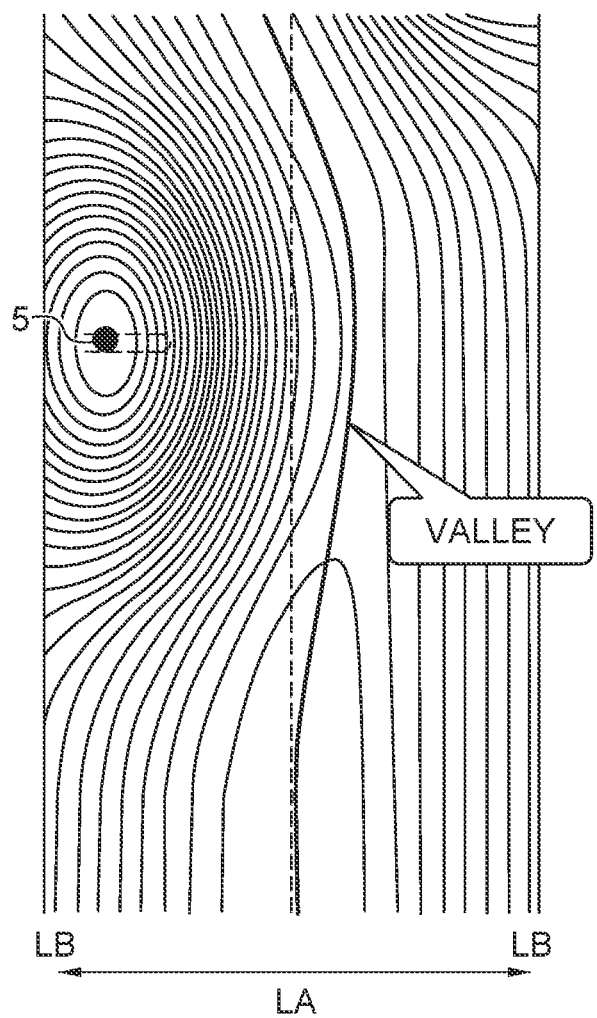
FIG. 8 is a conceptual diagram illustrating an overview of a steering control based on the risk potential field.

3. Steering Control Based on Risk Potential Field 3-1. Overview of Steering Control FIG. 8 is a conceptual diagram illustrating an overview of a steering control based on the risk potential field U. The risk potential field U as a whole is obtained by superimposing (adding) the components of the risk potential field U described above. When a plurality of objects 5 is present, the obstacle potential field Uo set for each object 5 is superimposed.

In the risk potential field U, there is a "valley" of the risk value R. As shown in FIG. 8, the valley of the risk potential field U is located so as to extend in the LX direction as a whole while avoiding the object 5. By executing the steering control such that the vehicle 1 follows the valley of the risk potential field U, it is possible to drive the vehicle 1 while reducing the risk of collision with the object 5. That is, the risk avoidance control is realized.

3-2. Steering Control Based on First Risk Potential Field

Figure 9:
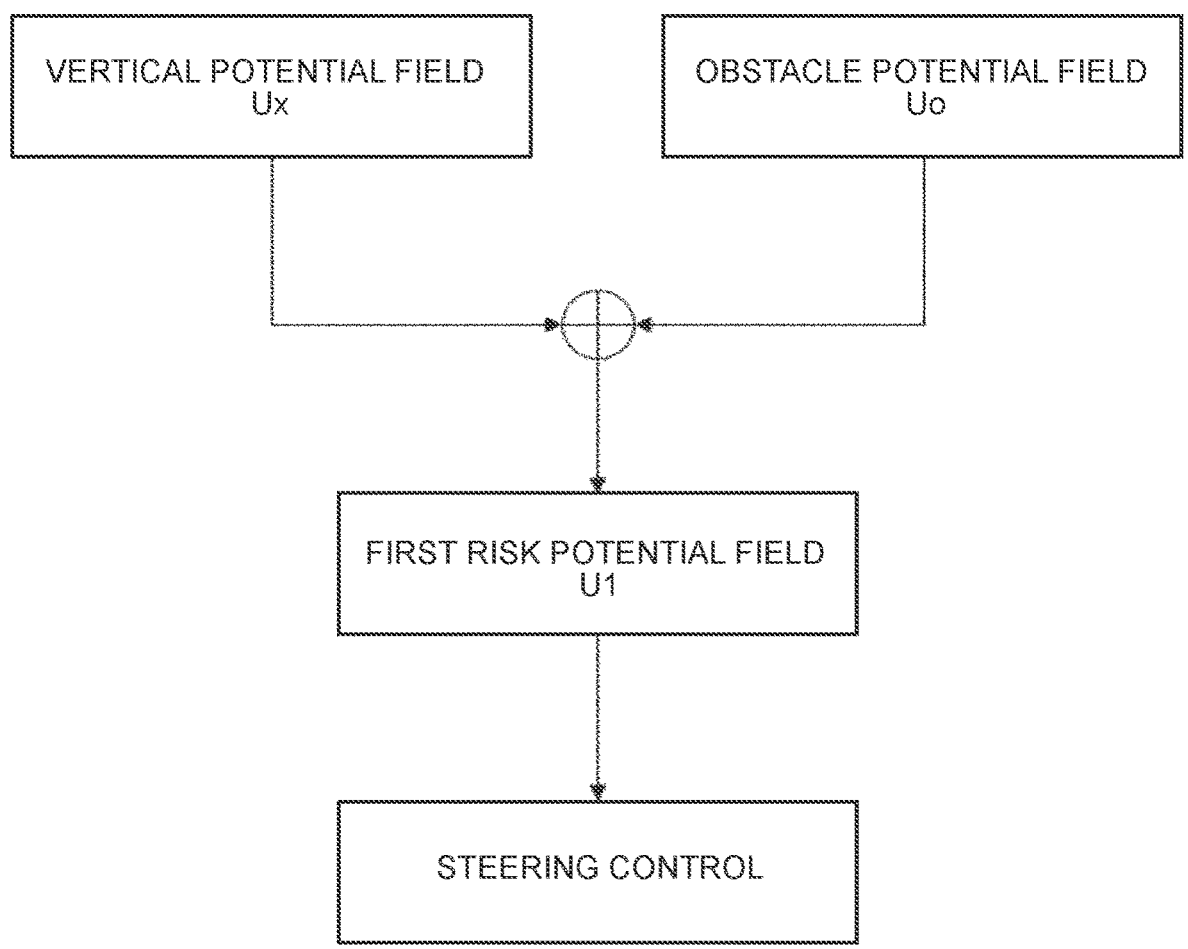
FIG. 9 is a block diagram illustrating an overview of the steering control according to the embodiment of the present disclosure.

FIG. 9 is a block diagram illustrating an overview of the steering control according to the present embodiment. The first risk potential field U1 is a risk potential field for the steering control. The first risk potential field U1 is the sum of a vertical potential field Ux and an obstacle potential field Uo [i], and is represented by the following equation (1).

Equation 1

$$U1 = Ux + \sum_{i}^{n} Uo[i] \quad (1)$$

The obstacle potential field Uo[i] is the obstacle potential field Uo related to the object 5[i] (i=1 to n). Here, n is the total number of objects 5 that are focused as the subjects of the risk avoidance control, and is an integer of 1 or more. The vertical potential field Ux is the vehicle center potential field Ue (see FIG. 6) or the lane center potential field Ur (see FIG. 7). In some examples, the vertical potential field Ux is the vehicle center potential field Ue.

A first valley V1 is a valley of the risk value R indicated by the first risk potential field U1. The processor 110 executes the steering control such that the vehicle 1 follows the first valley V1.

Figure 10:
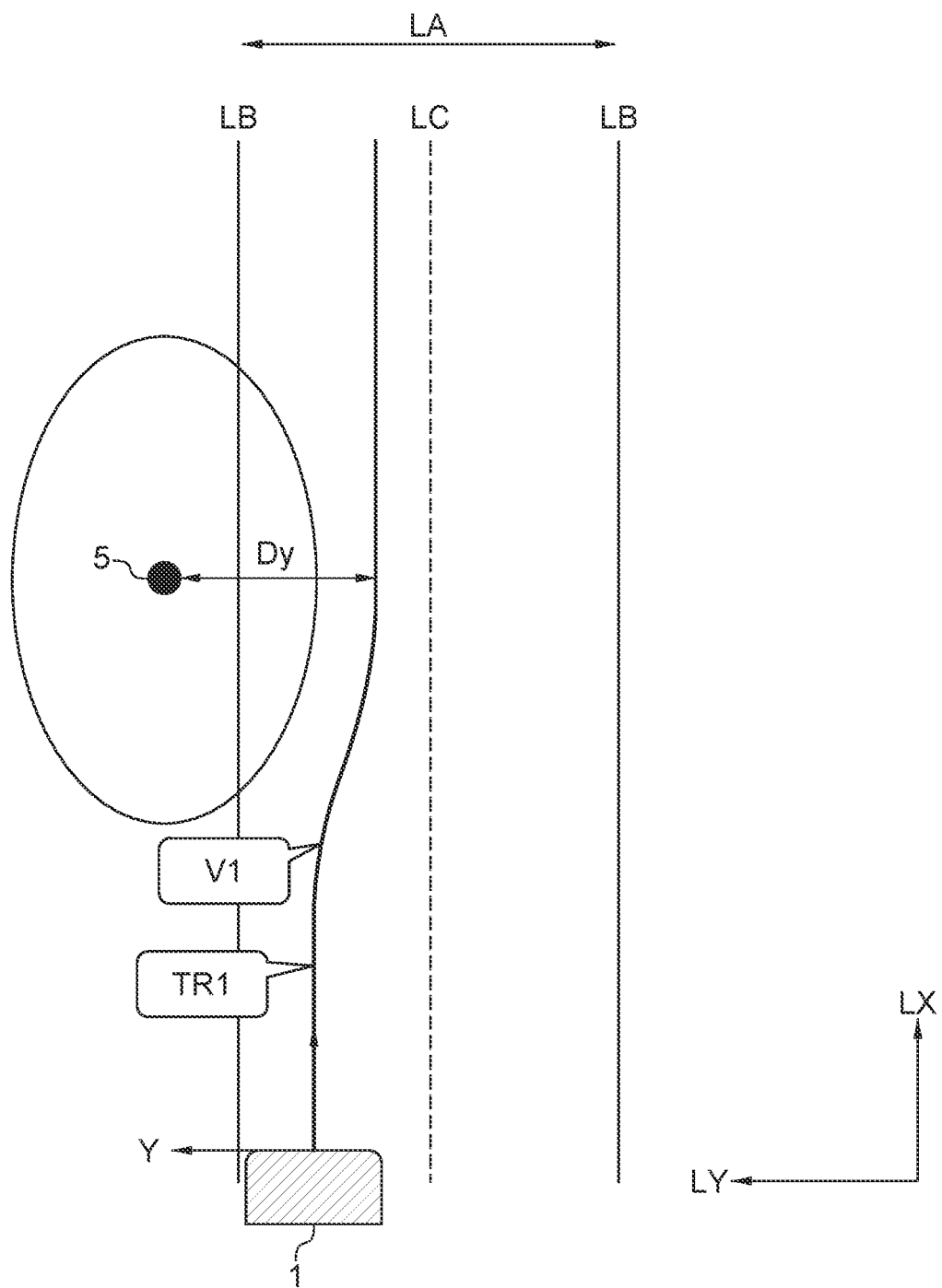
FIG. 10 is a conceptual diagram illustrating an example of the steering control according to the embodiment of the present disclosure.

FIG. 10 shows an example of the steering control according to the present embodiment. The first valley V1 extends in the LX direction from the position of the vehicle 1 and then shifts in a direction away from the object 5. The vehicle 1 first travels in the LX direction and is then steered in the direction away from the object 5 (trajectory TR1). When the lateral position of the vehicle 1 changes, the lateral position of the first valley V1 also changes accordingly. After that, the first valley V1 extends in the LX direction, and the vehicle 1 travels in the LX direction. The vehicle 1 passes by the object 5 at an appropriate lateral distance Dy.

Note that, when the vertical potential field Ux is the lane center potential field Ur, a force that attracts the vehicle 1 to the lane center LC is always generated by the lane center potential field Ur. The force that attracts the vehicle 1 to the lane center LC is preferable for suppressing the lane deviation. However, the force is essentially irrelevant to the object avoidance. Since the lane center potential field Ur causes vehicle behavior that is not related to the object avoidance, there is a possibility that the steering control serving as the risk avoidance control is executed unnecessarily or excessively.

In that sense, the vertical potential field Ux may be the vehicle center potential field Ue. The position of the valley Ve of the vehicle center potential field Ue is not fixed and dynamically changes in conjunction with the position of the vehicle 1. Since the valley Ve described above is reflected in the first valley V1, an unnecessary steering control or an excessive steering control is suppressed. Suppressing the unnecessary steering control or the excessive steering control means that appropriate vehicle behavior is realized for avoiding risks. Therefore, a sense of discomfort felt by the occupant of the vehicle 1 is suppressed.

3-3. Process Flow

Figure 11:
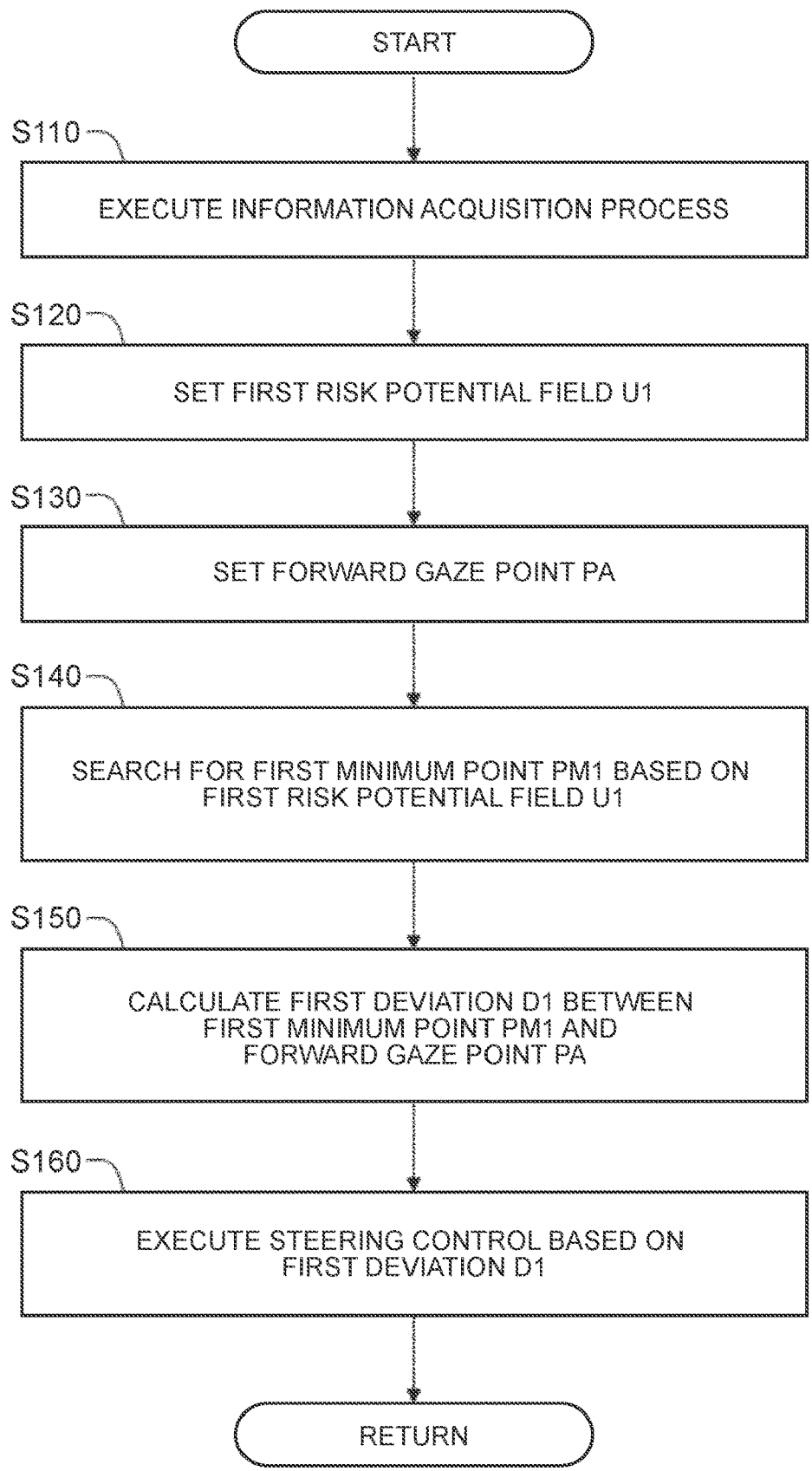
FIG. 11 is a flowchart showing a process related to the steering control according to the embodiment of the present disclosure.

FIG. 11 is a flowchart showing a process related to the steering control according to the present embodiment. The process flow shown in FIG. 11 is repeatedly executed at regular cycles.

3-3-1. Step S110

In step S110, the processor 110 executes the above-mentioned information acquisition process. That is, the processor 110 acquires the driving environment information 200 based on the detection result of the sensor group 20. The driving environment information 200 is stored in the storage device 120.

3-3-2. Step S120

In step S120, the processor 110 sets the first risk potential field U1. The first risk potential field U1 is the sum of the vertical potential field Ux and the obstacle potential field Uo[i] (see equation (1)). The vertical potential field Ux is, for example, the vehicle center potential field Ue. The processor 110 sets the vehicle center potential field Ue based on the driving environment information 200 and the potential function information 300. Further, the processor 110 sets the obstacle potential field Uo[i] for each object 5[i] based on the driving environment information 200 and the potential function information 300. The processor 110 sets the sum of the vehicle center potential field Ue and the obstacle potential field Uo[i] as the first risk potential field U1.

Figure 12:
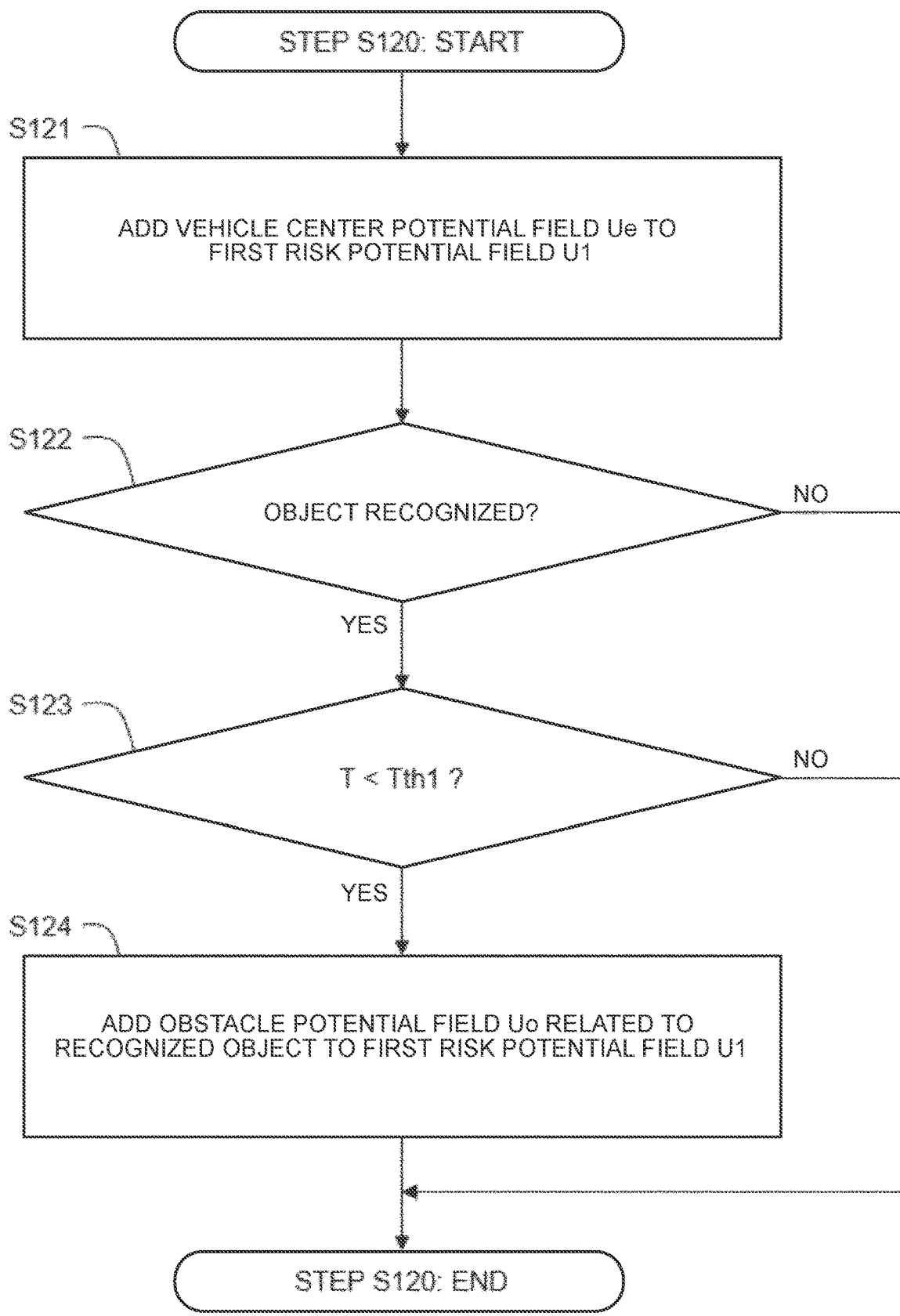
FIG. 12 is a flowchart showing a process example in step S120 in FIG. 11.

FIG. 12 is a flowchart showing an example of a process in step S120.

In step S121, the processor 110 sets the vehicle center potential field Ue based on the driving environment information 200 and the potential function information 300. Then, the processor 110 adds the vehicle center potential field Ue to the first risk potential field U1.

In step S122, the processor 110 determines whether the object 5 is present in front of the vehicle 1 based on the object information 250. In other words, the processor 110 determines whether the object 5 is recognized in the region in front of the vehicle 1. When the object 5 in front of the vehicle 1 is recognized (step S122; Yes), the process proceeds to step S123. Otherwise (step S122; No), step S120 ends.

In step S123, the processor 110 determines whether a margin time T to the recognized object 5 is less than a first time threshold value Tth1.

Figure 13:
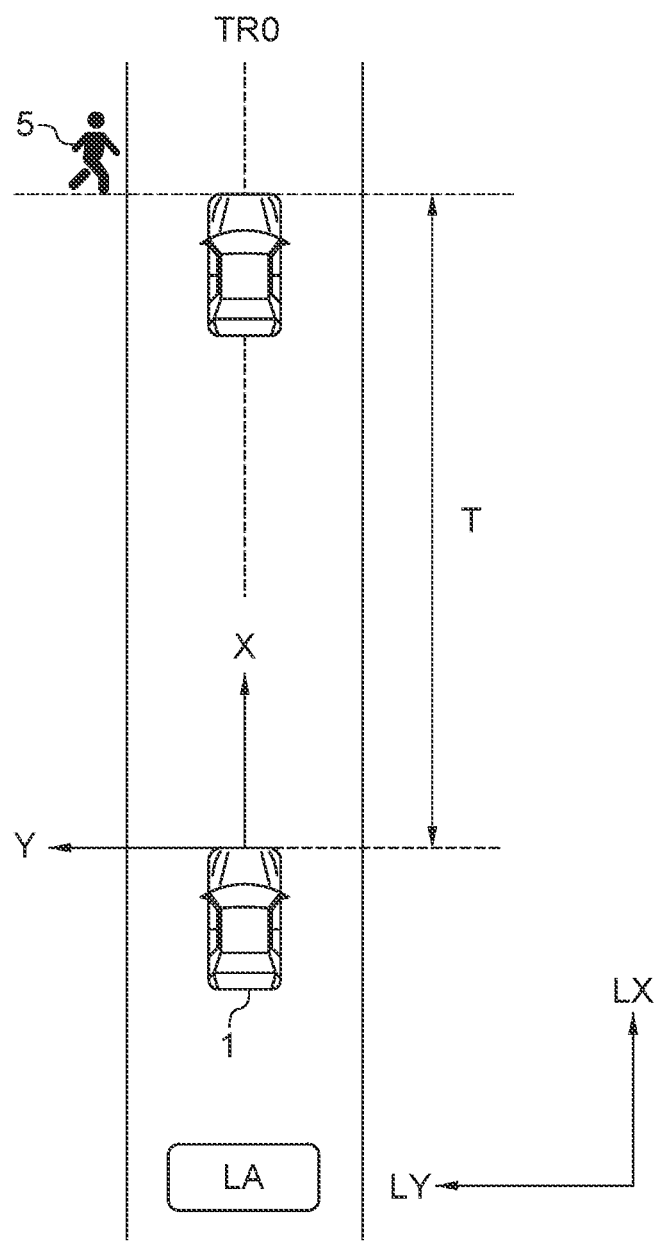
FIG. 13 is a conceptual diagram illustrating a margin time to an object.

The margin time T will be described with reference to FIG. 13. The trajectory TR0 represents the trajectory of the vehicle 1 when the risk avoidance control is not executed. The vehicle 1 is assumed to travel in the LX direction at the current vehicle speed. The margin time T is the time until the vehicle 1 comes closest to the object 5 under the above assumption. Typically, the timing at which the vehicle 1 comes closest to the object 5 is the timing at which the vehicle 1 passes by the object 5. The current vehicle speed of the vehicle 1 is obtained from the vehicle state information 220. The position of the object 5 is obtained from the object information 250. The arrangement of the lane LA and the LX direction can be obtained from the road configuration information 240 or the map information 260. Thus, the processor 110 can calculate the margin time T based on the driving environment information 200.

When the margin time T is less than the first time threshold value Tth1 (step S123; Yes), the process proceeds to step S124. Otherwise (step S123; No), step S120 ends.

In step S124, the processor 110 sets the obstacle potential field Uo related to the recognized object 5 based on the driving environment information 200 and the potential function information 300. Then, the processor 110 adds the obstacle potential field Uo to the first risk potential field U1. Thus, when the vehicle 1 approaches the object 5 to some extent, the obstacle potential field Uo related to the object 5 is added to the first risk potential field U1.

3-3-3. Step S130

In step S130, the processor 110 sets a forward gaze point PA at a position in front of the vehicle 1.

The forward gaze point PA will be described with reference to FIG. 14. The forward gaze point PA is set at a position in front of the vehicle 1 by a first distance S along the traveling direction of the vehicle 1 (X direction). The traveling direction of the vehicle 1 is obtained from the vehicle position information 210. The first distance S is a constant value. Alternatively, the first distance S may vary depending on the vehicle speed of the vehicle 1. In that case, the first distance S increases as the vehicle speed increases. The vehicle speed is obtained from the vehicle state information 220.

3-3-4. Step S140

In step S140, the processor 110 searches for a first minimum point PM1 that is a minimum point of the first risk potential field U1. In particular, the processor 110 searches for the first minimum point PM1 in the vicinity of the forward gaze point PA.

Figure 14:
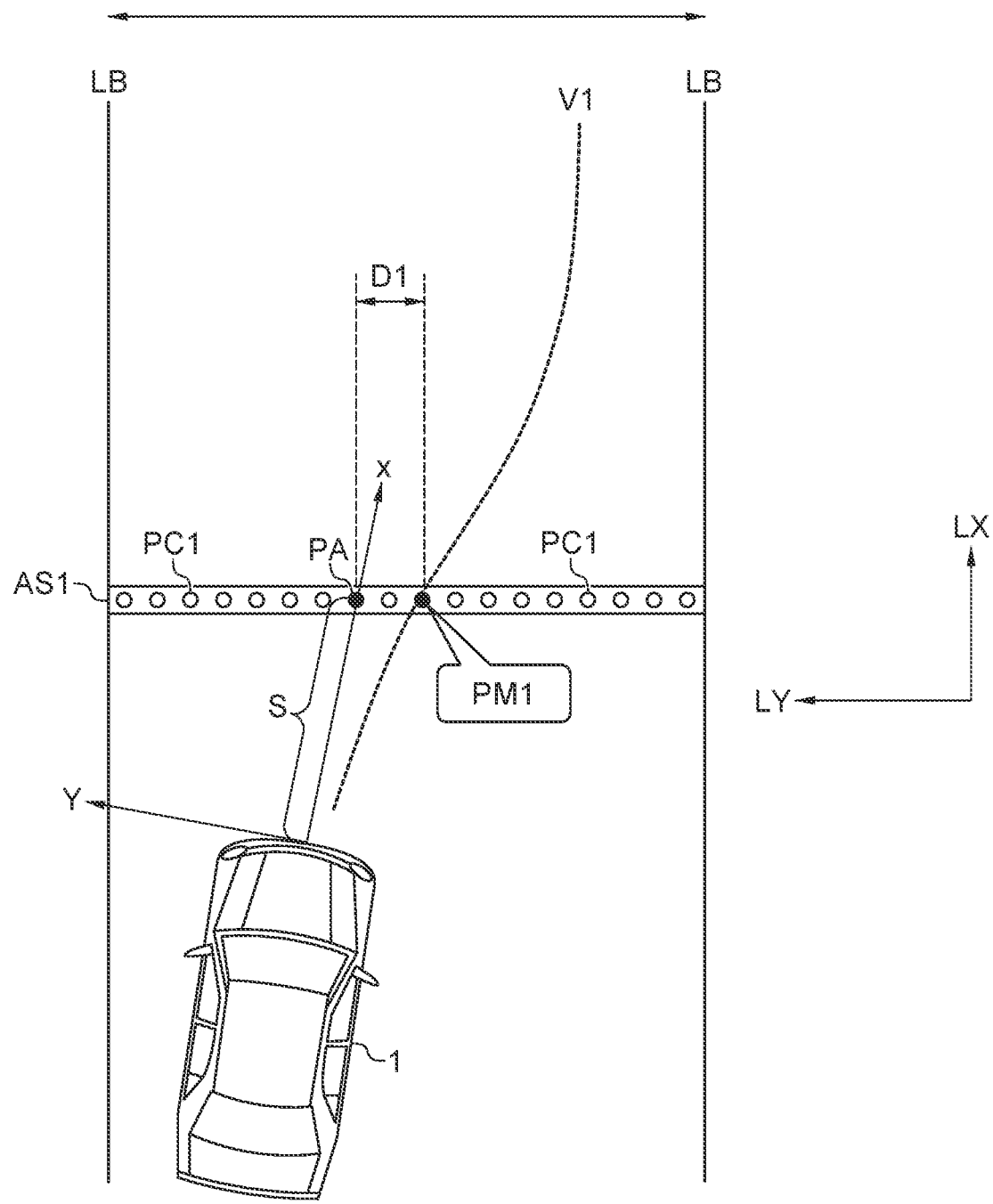
FIG. 14 is a conceptual diagram illustrating the steering control according to the embodiment of the present disclosure.

More specifically, the processor 110 sets a first search range AS1 as shown in FIG. 14. The first search range AS1 is a range extending in the LY direction (lane width direction) from the forward gaze point PA. The first search range AS1 is set to cover at least the range of the lane LA in the LY direction. Then, the processor 110 searches for the first minimum point PM1 in the first search range AS1.

For example, the processor 110 sets a plurality of checkpoints PC1 in the first search range AS1. The processor 110 calculates the risk value R at each checkpoint PC1 with reference to the first risk potential field U1. By substituting the position of each checkpoint PC1 into the potential functions (fe, fo) constituting the first risk potential field U1, the risk value R at each checkpoint PC1 can be calculated. Then, the processor 110 determines the checkpoint PC1 at which the risk value R is the minimum as the first minimum point PM1.

Thus, the first minimum point PM1 is searched for in the first search range AS1 in the vicinity of the forward gaze point PA. It is not necessary to calculate the risk value R over the entire lane LA to search for the first minimum point PM1. Therefore, the calculation load required for searching for the first minimum point PM1 is significantly reduced.

3-3-5. Step S150

In step S150, the processor 110 calculates a first deviation D1. The first deviation D1 is a deviation in the LY direction between the forward gaze point PA and the first minimum point PM1.

3-3-6. Step S160

In step S160, the processor 110 executes the steering control such that the first deviation D1 is reduced. Specifically, the processor 110 calculates a target steering angle θt required for reducing the first deviation D1. Typically, as the first deviation D1 becomes larger, the target steering angle θt becomes larger. A function (e.g., map) showing the correspondence between the first deviation D1 and the target steering angle θt is generated in advance. The processor 110 calculates the target steering angle θt in accordance with the first deviation D1 by referring to the function. Then, the processor 110 executes the steering control in accordance with the target steering angle θt. The actual steering angle of the vehicle 1 is obtained from the vehicle state information 220. The processor 110 controls the steering device 31 to steer the wheels such that the target steering angle θt is realized.

As described above, the steering control is executed such that the vehicle 1 approaches the first minimum point PM1. The first valley V1 of the first risk potential field U1 corresponds to a set of the first minimum points PM1 that are temporally continuous. By executing the steering control such that the vehicle 1 approaches the first minimum point PM1, the vehicle 1 can be made to follow the first valley V1 of the first risk potential field U1. That is, the risk avoidance control is realized.

Figure 15:
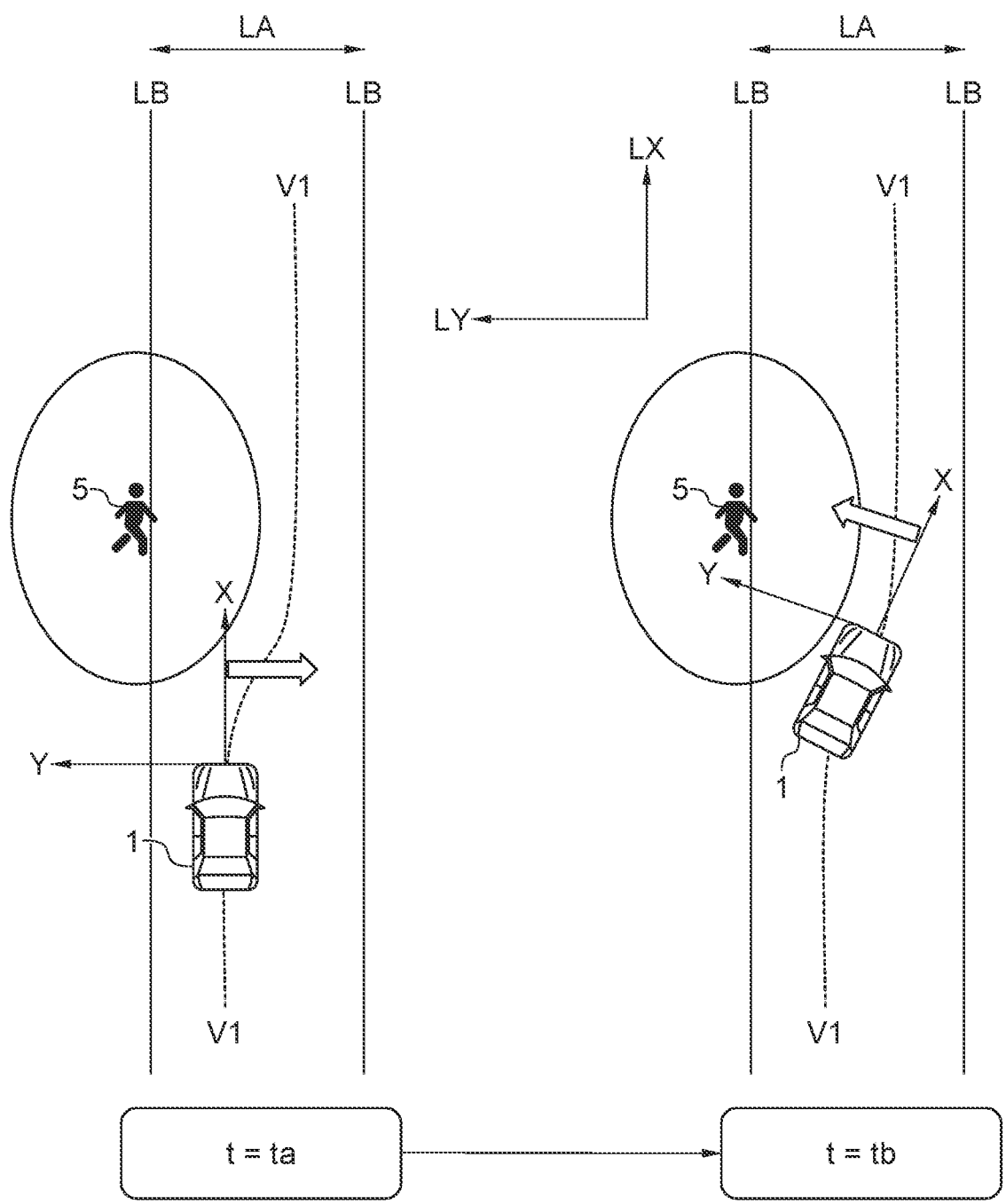
FIG. 15 is a conceptual diagram illustrating the steering control according to the embodiment of the present disclosure.

The reason why lane departure is suppressed in the present embodiment will be described with reference to FIG. 15. As described above, the forward gaze point PA is set at a position in the traveling direction of the vehicle 1 (X direction). At a timing ta, the first minimum point PM1 in front of the vehicle 1 is shifted in the direction to avoid the object 5. At the timing ta, the forward gaze point PA is located on the left side of the first valley V1. The steering direction to reduce the first deviation D1 is the right direction. Therefore, the vehicle 1 turns to the right. When the vehicle 1 turns to the right, the forward gaze point PA also turns to the right.

At a timing tb after the vehicle 1 turns to the right, the forward gaze point PA is located on the right side of the first valley V1. The steering direction to reduce the first deviation D1 is the left direction. Therefore, a return steering force that restores the traveling direction of the vehicle 1 is generated. As a result, the vehicle 1 returns to the traveling state parallel to the lane LA without departing from the lane LA. Thus, since the forward gaze point PA is set at the position in the traveling direction of the vehicle 1 (X direction), the vehicle 1 is suppressed from departing from the lane LA.

3-4. Process When a Plurality of First Minimum Points Candidates is Present

Figure 16:
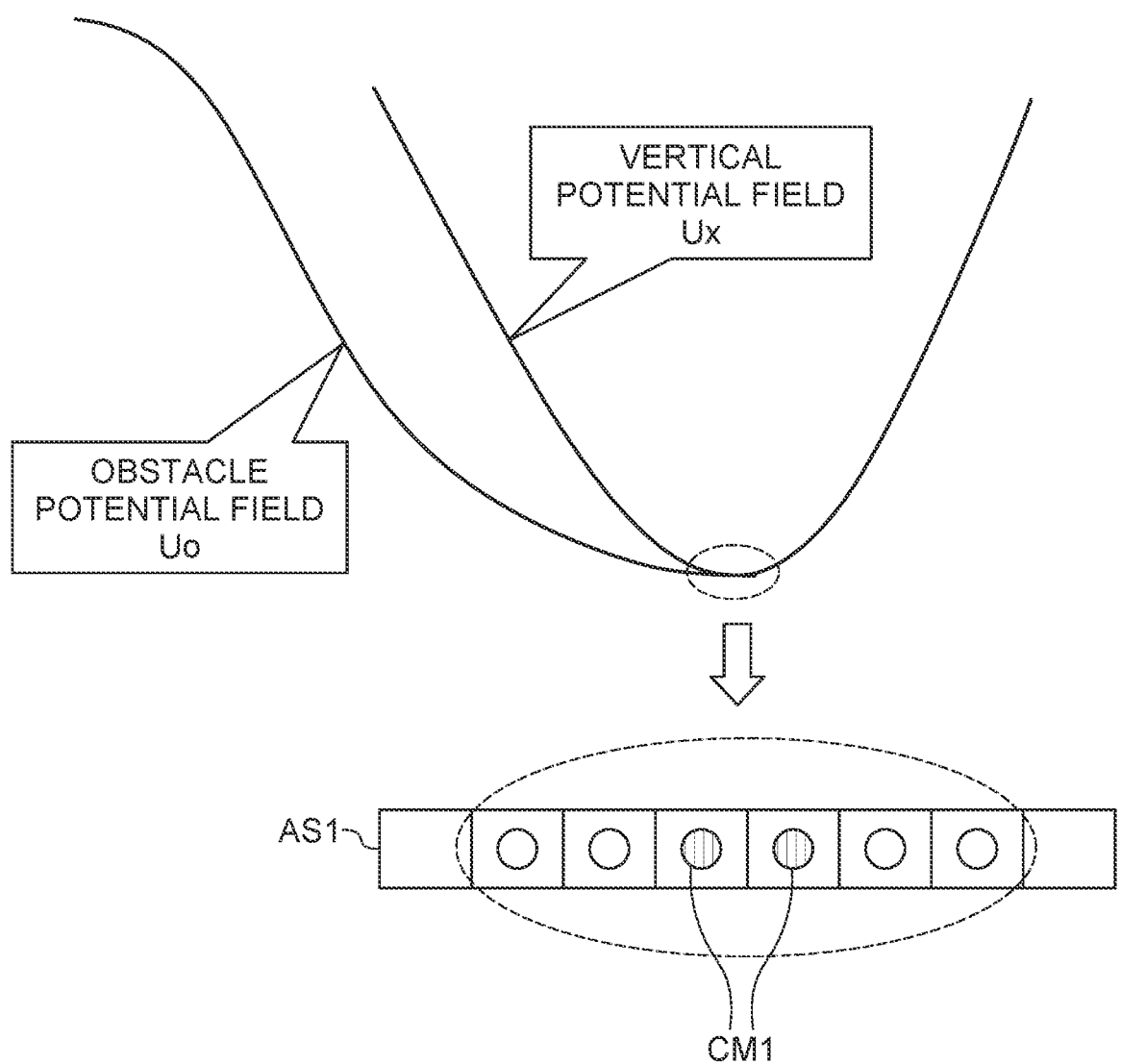
FIG. 16 is a conceptual diagram illustrating an example of a plurality of first minimum point candidates according to the embodiment of the present disclosure.

As described above, the first minimum point PM1 of the first risk potential field U1 for the steering control is searched for in the first search range AS1. At this time, depending on the number of significant digits of the risk value R, there is a possibility that a plurality of candidates for the first minimum point PM1 can be found in the first search range AS1. The candidate for the first minimum point PM1 in the first search range AS1 will be hereinafter referred to as "first minimum point candidate CM1". For example, in the example shown in FIG. 16, as a result of superimposing the vertical potential field Ux and the obstacle potential field Uo[i], two first minimum point candidates CM1 are present in the first search range AS1.

When an inappropriate first minimum point candidate CM1 is selected from the first minimum point candidates CM1 as the first minimum point PM1, an inappropriate risk avoidance control is to be executed. The occupant of the vehicle 1 (typically the driver) feels uncomfortable with the inappropriate risk avoidance control. In order to realize the risk avoidance control with less sense of discomfort, it is important to select an appropriate first minimum point PM1 from the first minimum point candidates CM1.

Figure 17:
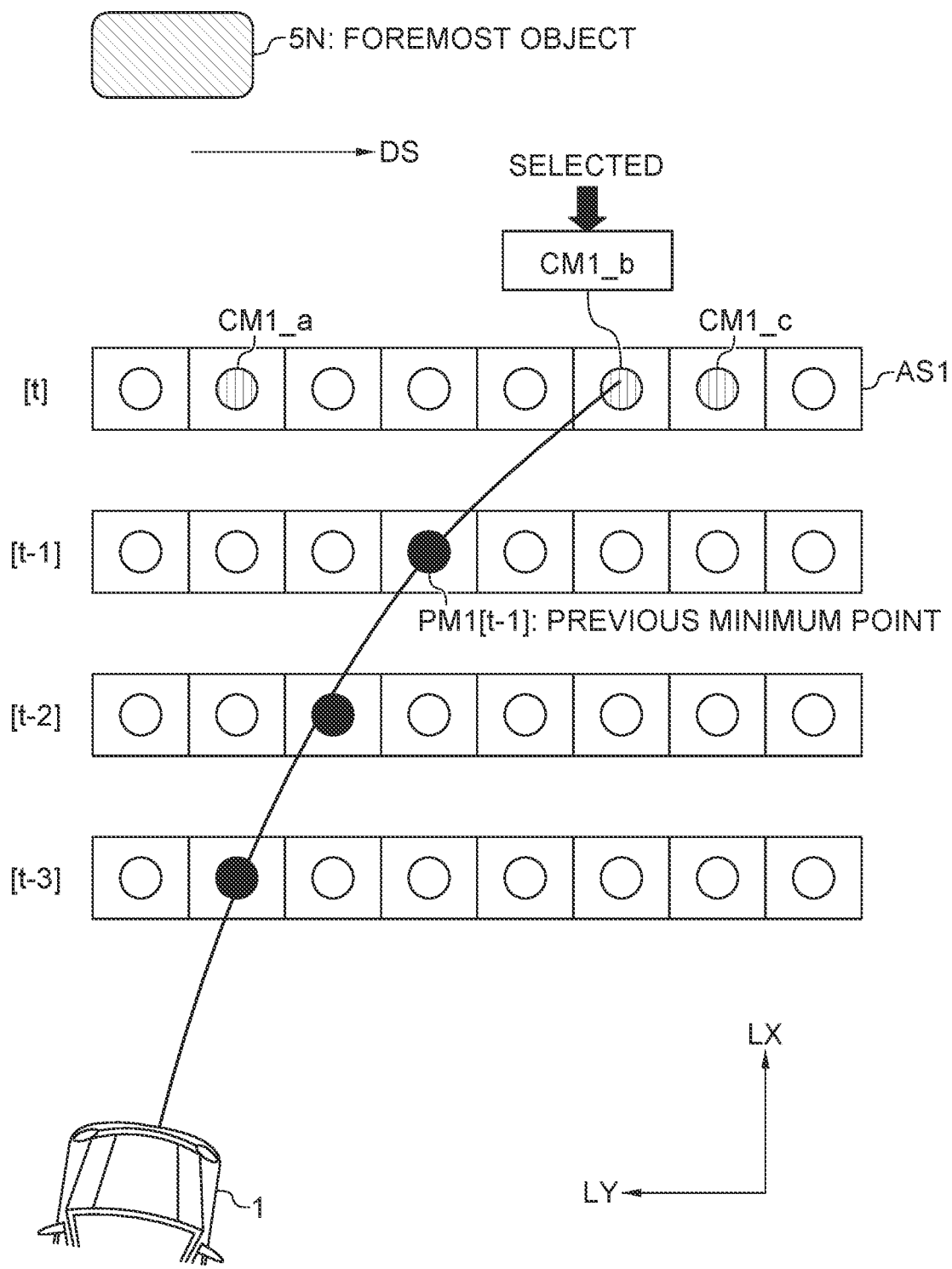
FIG. 17 is a conceptual diagram illustrating a method of selecting an appropriate first minimum point from the first minimum point candidates according to the embodiment of the present disclosure.

FIG. 17 is a conceptual diagram for explaining a method of selecting an appropriate first minimum point PM1 from the first minimum point candidates CM1. FIG. 17 shows an example of the first minimum point candidates CM1 in the search process of the current cycle (time t). In this example, three first minimum point candidates CM1_a, CM1_b, CM1_c are present in the first search range AS1.

Further, FIG. 17 shows an example of the history of the first minimum point PM1 determined in the search process in the past (time t-3, t-2, t-1). In particular, the first minimum point PM1 [t-1] in the previous cycle is referred to as a "previous minimum point". A foremost object 5N is the closest to the vehicle 1 among the objects 5 present in front of the vehicle 1. That is, the foremost object 5N is the object 5 that is the subject of the latest risk avoidance control. A first steering direction DS is a steering direction away from the foremost object 5N.

First, the first minimum point candidate CM1_a is present in a direction approaching the foremost object 5N when viewed from the previous minimum point PM1 [t-1]. If the first minimum point candidate CM1_a is selected as the current first minimum point PM1 [t], the steering control is executed such that the vehicle 1 approaches the foremost object 5N. The steering control described above is inappropriate and causes the occupant of the vehicle 1 to feel uncomfortable and uneasy.

Both the first minimum point candidates CM1_b, CM1_c are present in the first steering direction DS away from the foremost object 5N when viewed from the previous minimum point PM1 [t-1]. From the first minimum point candidates CM1_b, CM1_c, the first minimum point candidate CM1_b is close to the previous minimum point PM1 [t-1], and the first minimum point candidate CM1_c is away from the previous minimum point PM1 [t-1]. If the first minimum point candidate CM1_c is selected as the current first minimum point PM1 [t], the steering control is to be excessively executed. The occupant of the vehicle 1 may feel uncomfortable with the excessive steering control described above.

Therefore, the processor 110 selects the first minimum point candidate CM1_b as the current first minimum point PM1 [t]. Generally speaking, the processor 110 selects, as the current first minimum point PM1 [t], the first minimum point candidate CM1 that is present in the first steering direction DS away from the foremost object 5N when viewed from the previous minimum point PM1 [t-1] and is the closest to the previous minimum point PM1 [t-1]. As a result, an inappropriate steering control and an excessive steering control are suppressed. That is, it is possible to suppress a sense of discomfort with respect to the risk avoidance control (steering control) based on the first risk potential field U1.

3-5. Effects

As described above, according to the present embodiment, the first risk potential field U1 is applied to the steering control of the risk avoidance control. Specifically, the steering control is executed so as to follow the first valley V1 of the first risk potential field U1.

The first valley V1 is a set of the first minimum points PM1 that are temporally continuous. The first minimum point PM1 is searched for in the first search range AS1 in the vicinity of the forward gaze point PA. It is not necessary to calculate the risk value R over the entire lane LA to search for the first minimum point PM1. Therefore, the calculation load required for searching for the first minimum point PM1 is significantly reduced.

When the first minimum point candidates CM1 are present in the first search range AS1, the first minimum point candidate CM1 that is present in the first steering direction DS away from the foremost object 5N when viewed from the previous minimum point PM1 [t-1] and is the closest to the previous minimum point PM1 [t-1] is selected as the current first minimum point PM1 [t]. As a result, an inappropriate steering control and an excessive steering control are suppressed. That is, it is possible to suppress a sense of discomfort with respect to the risk avoidance control (steering control) based on the first risk potential field U1.

The first risk potential field U1 includes the vertical potential field Ux for the vehicle 1 to travel along the lane LA. The vertical potential field Ux may be the vehicle center potential field Ue. The position of the valley Ve of the vehicle center potential field Ue is not fixed and dynamically changes in conjunction with the position of the vehicle 1. Since the valley Ve described above is reflected in the first minimum point PM1, an unnecessary steering control or an excessive steering control is suppressed. Suppressing the unnecessary steering control or the excessive steering control means that appropriate vehicle behavior is realized for avoiding risks. Therefore, a sense of discomfort felt by the occupant of the vehicle 1 is suppressed.

Further, according to the present embodiment, the target steering angle θt (trajectory TR1) of the vehicle 1 is uniquely determined from the first risk potential field U1. As a comparative example, a method of generating a plurality of types of target trajectories and selecting an optimum target trajectory from the target trajectories will be discussed. In the case of this comparative example, it is necessary to evaluate each target trajectory using an evaluation function, which increases the calculation load. In particular, in a situation where a plurality of the objects 5 is present, the evaluation function becomes complicated and the calculation load markedly increases. On the other hand, according to the present embodiment, the evaluation function described above is unnecessary, whereby the calculation load is reduced. As the number of the objects 5 increases, the effect of reducing the calculation load becomes more remarkable.

4. Deceleration Control Based on Risk Potential Field

4-1. Overview of Deceleration Control

Figure 18:
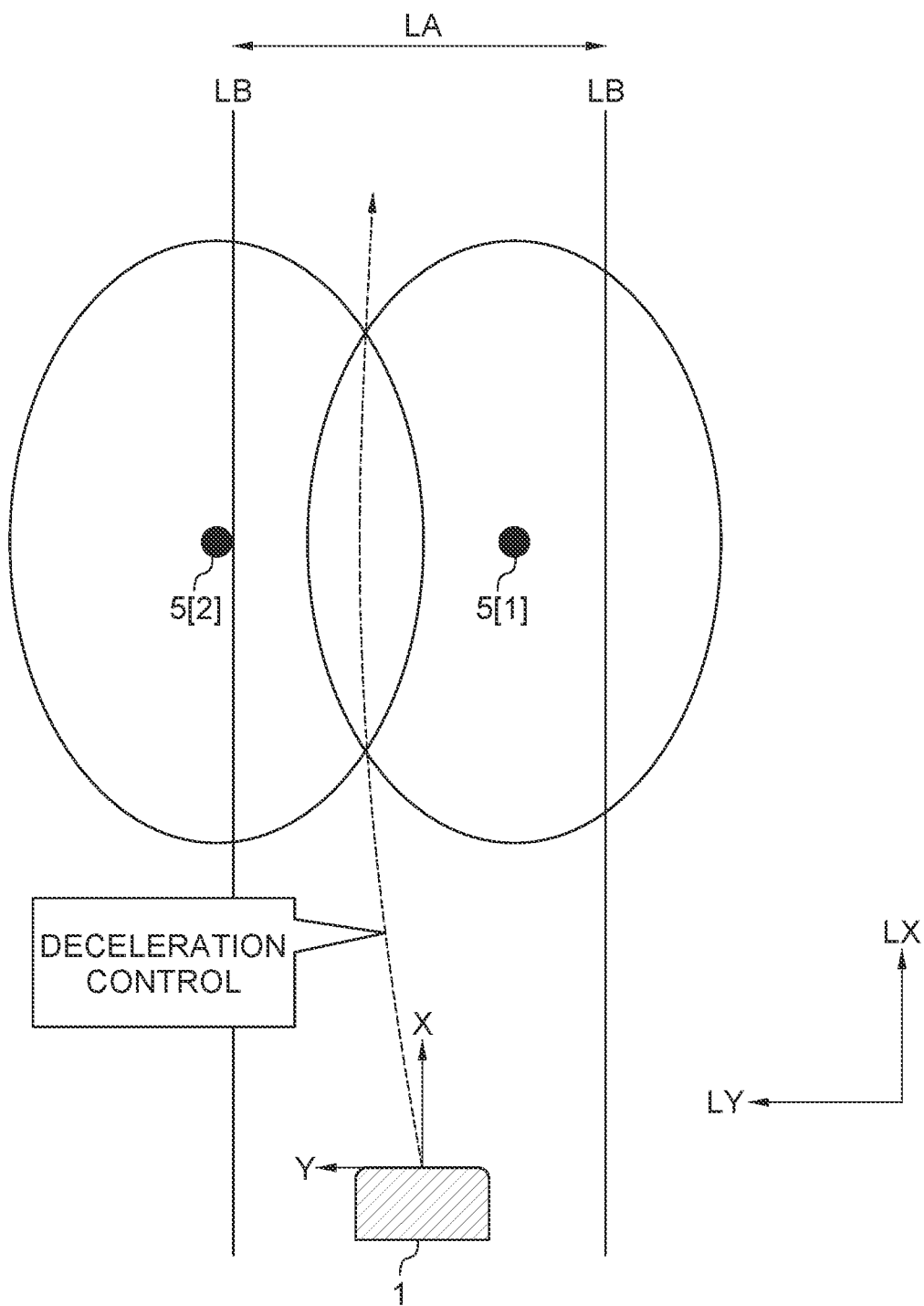
FIG. 18 is a conceptual diagram illustrating an overview of a deceleration control according to the embodiment of the present disclosure.

FIG. 18 is a conceptual diagram illustrating the deceleration control based on the risk potential field U. In FIG. 18, two objects 5[1], 5[2] in front of the vehicle 1 are shown. These two objects 5[1], 5[2] are located relatively close to each other. In such a situation, even when the above-mentioned steering control is activated, the vehicle 1 passes by relatively close to the objects 5[1] and 5[2]. As a result, the risk of collision with the object 5[1] is not sufficiently reduced, and the occupant of the vehicle 1 may feel uneasy.

Therefore, in the situation illustrated in FIG. 18, it is conceivable to execute the deceleration control instead of the steering control or together with the steering control. The concept of "suppression amount" will be introduced as a criterion for determining under what circumstances the deceleration control should be executed and at what degree of deceleration the deceleration control should be executed.

Figure 19:
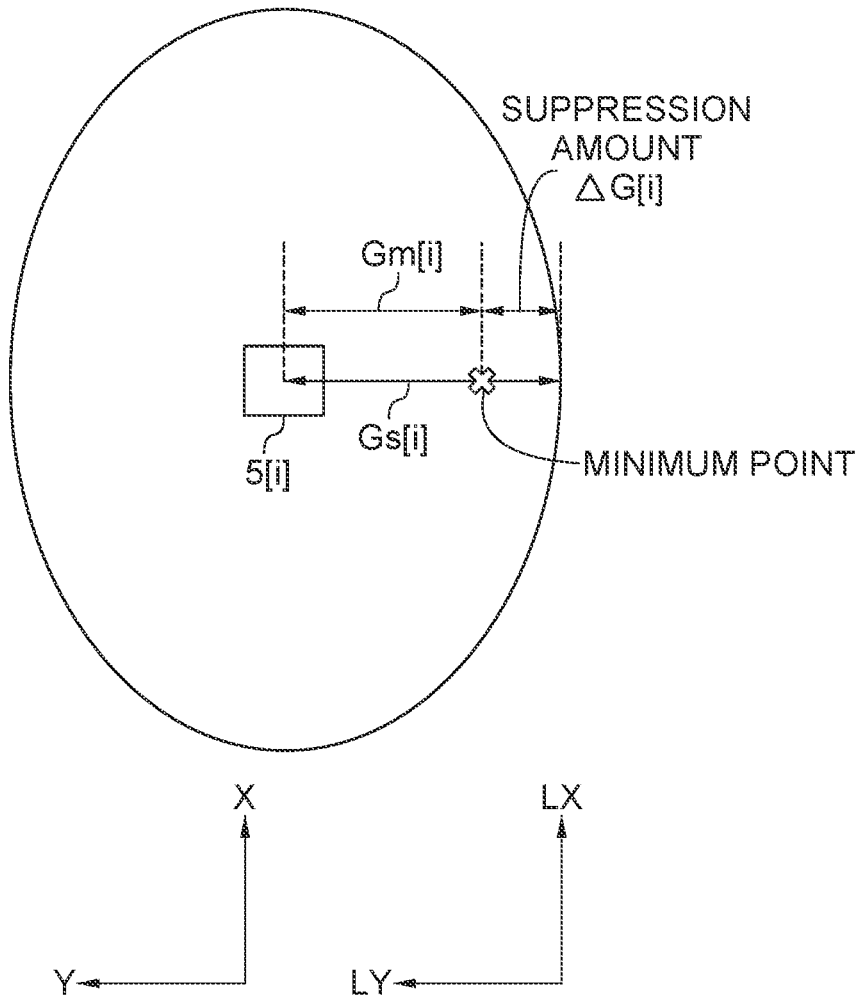
FIG. 19 is a conceptual diagram illustrating a suppression amount used in the deceleration control according to the embodiment of the present disclosure.

FIG. 19 is a conceptual diagram illustrating the suppression amount used in the deceleration control.

First, a unit gap Gs[i] related to the object 5[i] will be described. The unit gap Gs[i] is a lateral distance between the vehicle 1 and the object 5[i] and is a lateral distance at which the occupant does not feel uneasy when the vehicle 1 passes by the object 5[i]. That is, the unit gap Gs[i] is a target lateral distance. The unit gap Gs[i] is determined in advance for each object 5[i]. The unit gap Gs[i] may be a predetermined value different for each type of the object 5. For example, the unit gap Gs (e.g., 3 m) in the case where the object 5 is a pedestrian is larger than the unit gap Gs (e.g., 2 m) in the case where the object 5 is a parked vehicle. The unit gap Gs[i] may be set based on the distribution parameter σy (see FIG. 5) of the obstacle potential field Uo[i]. The information of the unit gap Gs[i] is included in the above-mentioned potential function information 300, for example.

Next, a correction gap Gm[i] related to the object 5[i] will be described. The correction gap Gm[i] is a lateral distance between the object 5[i] and the valley of the risk potential field U. The correction gap Gm[i] can be calculated based on the position of the object 5[i] and the risk potential field U.

The suppression amount ΔG[i] related to the object 5[i] is the difference between the unit gap Gs[i] and the correction gap Gm[i]. That is, the suppression amount ΔG [i] is represented by the expression: ΔG [i]=Gs [i]−Gm [i].

When the correction gap Gm[i] is smaller than the unit gap Gs[i], it means that another object 5[j] is present near the object 5[i] and the unit gap Gs[i] cannot be secured. That is, the situation where the correction gap Gm[i] is smaller than the unit gap Gs[i] corresponds to the situation shown in FIG. 18. In such a situation, the deceleration control may be executed in order to reduce the collision risk and a sense of uneasiness of the occupant. Therefore, it can be said that the suppression amount ΔG [i] represents the necessity of the deceleration control.

According to the present embodiment, it is determined whether to execute the deceleration control based on the suppression amount ΔG[i]. Specifically, when the suppression amount ΔG[i] is larger than a threshold value Gth, the deceleration control is executed. A target deceleration At in the deceleration control may be set based on the suppression amount ΔG[i]. For example, the target deceleration At (absolute value) is set to increase as the suppression amount ΔG[i] increases.

As described above, in the deceleration control based on the risk potential field U, the suppression amount ΔG[i] is used as a determination criterion. In order to properly execute the deceleration control, it is necessary to appropriately calculate the suppression amount ΔG[i].

4-2. Deceleration Control Based on Second Risk Potential Field

Figure 20:
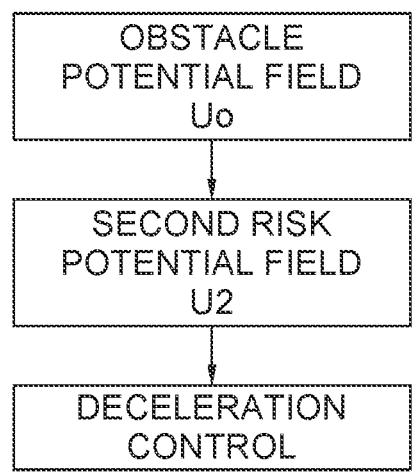
FIG. 20 is a block diagram illustrating an overview of the deceleration control according to the embodiment of the present disclosure.

FIG. 20 is a block diagram illustrating an overview of the deceleration control according to the present embodiment. The second risk potential field U2 is a risk potential field for the deceleration control. The second risk potential field U2 at least includes the sum of the obstacle potential fields Uo[i] respectively set for the objects 5[i]. For example, the second risk potential field U2 is represented by the following equation (2).

Equation 2

$$U2 = \sum_{i}^{n} Uo[i] \qquad (2)$$

The processor 110 calculates the correction gap Gm[i] and the suppression amount ΔG[i] based on the second risk potential field U2. More specifically, a second valley V2 is a valley of the risk value R represented by the second risk potential field U2. The correction gap Gm[i] is the lateral distance between the object 5[i] and the second valley V2. The suppression amount ΔG[i] is the difference between the unit gap Gs[i] and the correction gap Gm[i].

Figure 21:
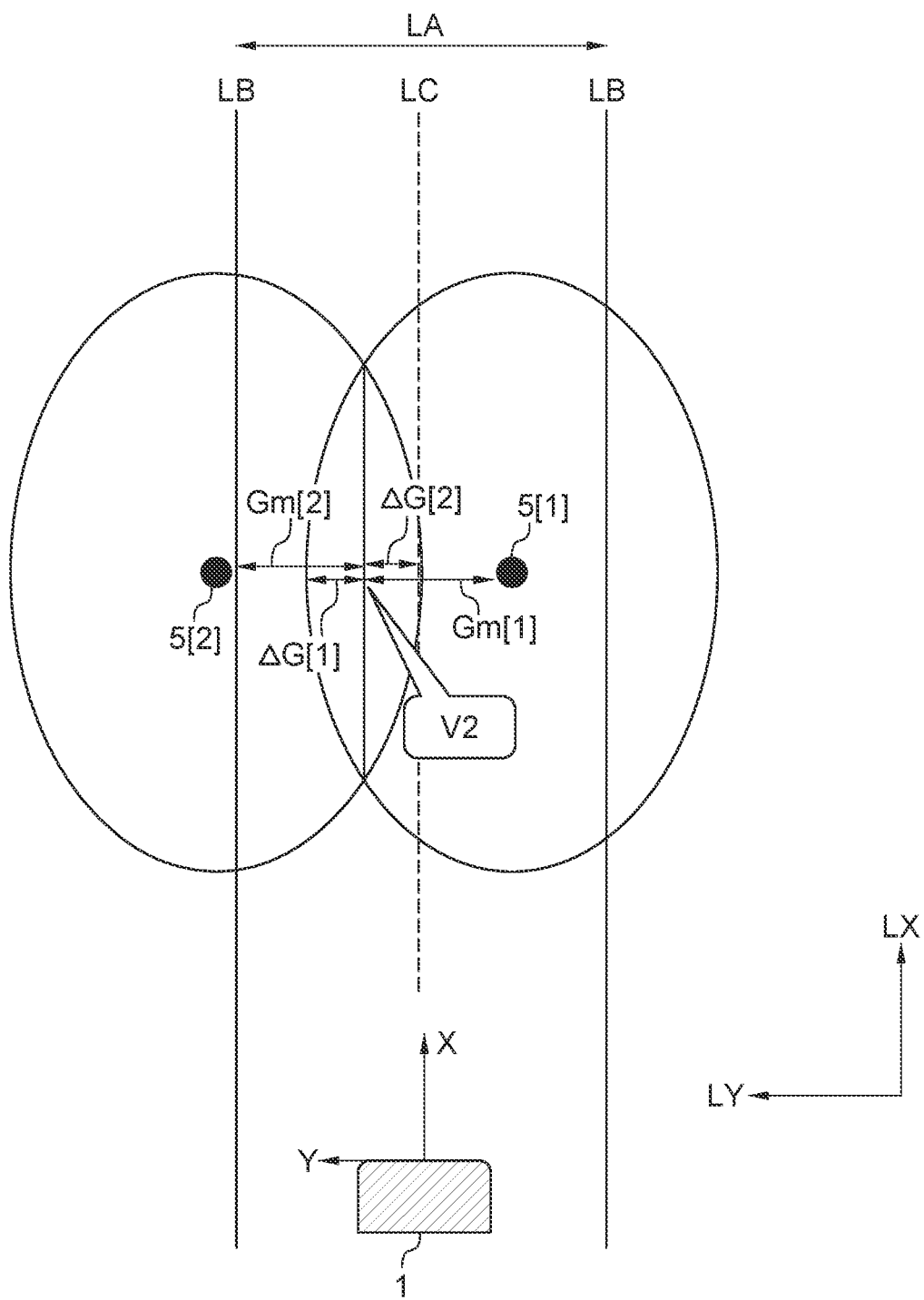
FIG. 21 is a conceptual diagram illustrating an example of the deceleration control according to the embodiment of the present disclosure.

FIG. 21 shows an example of the deceleration control according to the present embodiment. The positional relationship between the two objects 5[1], 5[2] is the same as that in the case of FIG. 18 described above. For the sake of simplicity, it is assumed that the obstacle potential field Uo[1] related to the object 5[1] and the obstacle potential field Uo[2] related to the object 5[2] have the same magnitude. Further, it is assumed that the unit gap Gs[1] related to the object 5[1] and the unit gap Gs[2] related to the object 5[2] are the same. Since the second risk potential field U2 includes only the obstacle potential field Uo[i], the position of the second valley V2 of the second risk potential field U2 coincides with the midpoint between the two objects 5[1] and 5[2]. Therefore, both the suppression amounts ΔG[1], ΔG[2] become reasonable values incorporating the proximity situation of the objects 5[1], 5[2]. In other words, overestimation or underestimation of the suppression amounts ΔG[1], ΔG[2] is suppressed. As a result, an unnecessary deceleration control or an excessive deceleration control is suppressed.

As a modification, the second risk potential field U2 may be the same as the first risk potential field U1 represented by the above equation (1). However, in the case of this modification, the suppression amount ΔG may be excessive. When the suppression amount ΔG is excessive, the deceleration control operates unnecessarily, or the target deceleration At in the deceleration control becomes excessive. The occupant (typically, the driver) of the vehicle 1 may feel uncomfortable with the unnecessary deceleration control or excessive deceleration control described above. In that sense, the second risk potential field U2 may include only the obstacle potential field Uo[i].

It should be noted that the second risk potential field U2 is only used for calculating the suppression amount ΔG[i], and is not used for the steering control.

4-3. Process Flow

Figure 22:
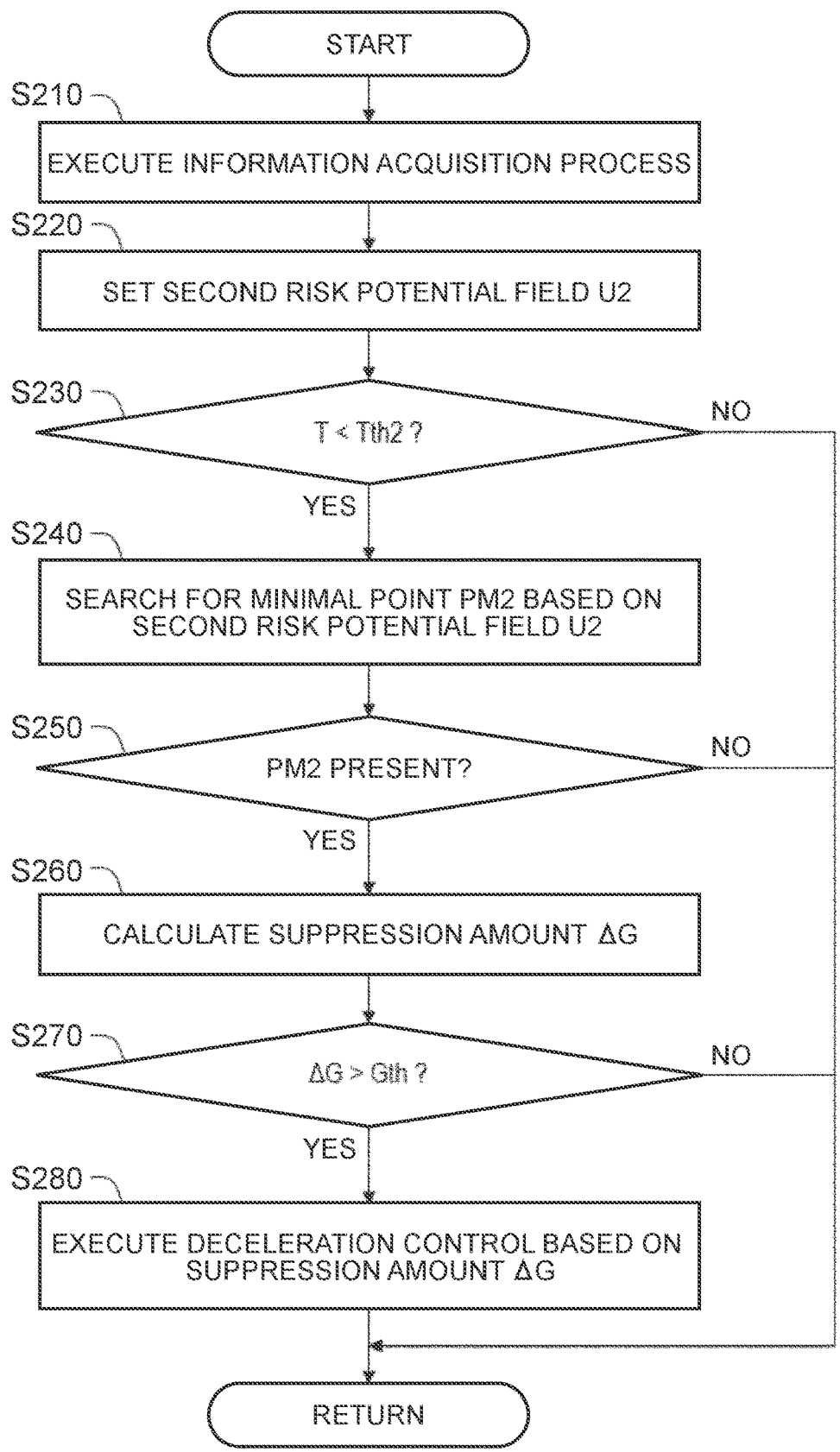
FIG. 22 is a flowchart showing a process related to the deceleration control according to the embodiment of the present disclosure.

FIG. 22 is a flowchart showing a process related to the deceleration control according to the present embodiment. The process flow shown in FIG. 22 is repeatedly executed at regular cycles.

4-3-1. Step S210

In step S210, the processor 110 executes the above-mentioned information acquisition process. That is, the processor 110 acquires the driving environment information 200 based on the detection result of the sensor group 20. The driving environment information 200 is stored in the storage device 120. Note that step S210 may be the same as step S110 in FIG. 11.

4-3-2. Step S220

In step S220, the processor 110 sets the second risk potential field U2. The second risk potential field U2 includes the sum of the obstacle potential fields Uo[i] (see equation (2)). The processor 110 sets the obstacle potential field Uo[i] for each object 5[i] based on the driving environment information 200 and the potential function information 300. Then, the processor 110 sets the second risk potential field U2 by superimposing the obstacle potential field Uo[i] set for the object 5[i].

Figure 23:
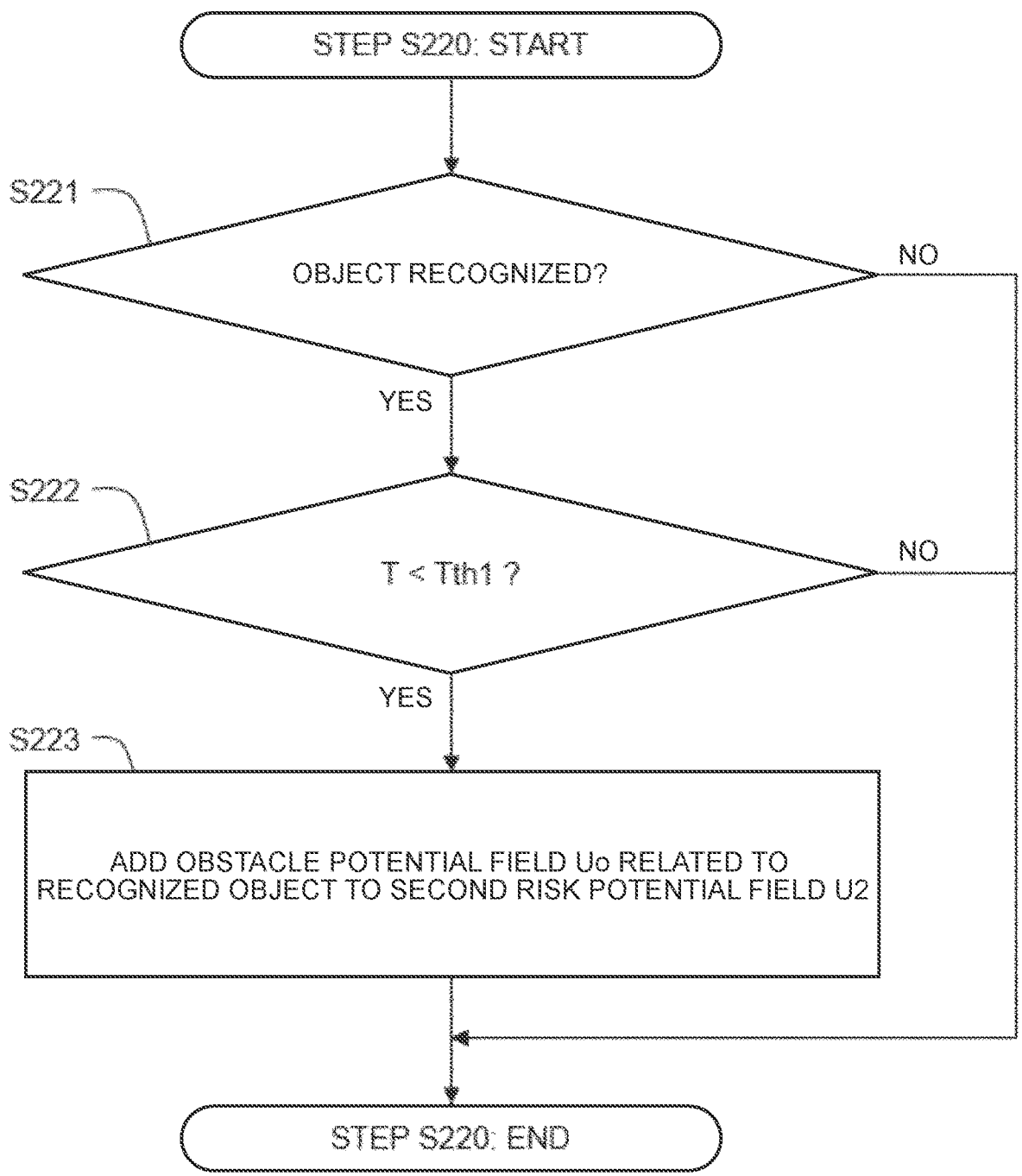
FIG. 23 is a flowchart showing a process example in step S220 in FIG. 22.

FIG. 23 is a flowchart showing an example of a process in step S220.

In step S221, the processor 110 determines whether the object 5 is present in front of the vehicle 1 based on the object information 250. In other words, the processor 110 determines whether the object 5 is recognized in the region in front of the vehicle 1. When the object 5 in front of the vehicle 1 is recognized (step S221; Yes), the process proceeds to step S222. Otherwise (step S221; No), step S220 ends. Note that step S221 may be the same as step S122 in FIG. 12.

In step S222, the processor 110 determines whether the margin time T to the recognized object 5 is less than the first time threshold value Tth1. When the margin time T is less than the first time threshold value Tth1 (step S222; Yes), the process proceeds to step S223. Otherwise (step S222; No), step S220 ends. Note that step S222 may be the same as step S123 in FIG. 12.

In step S223, the processor 110 sets the obstacle potential field Uo related to the recognized object 5 based on the driving environment information 200 and the potential function information 300. Then, the processor 110 adds the obstacle potential field Uo to the second risk potential field U2. Thus, when the vehicle 1 approaches the object 5 to some extent, the obstacle potential field Uo related to the object 5 is added to the second risk potential field U2.

4-3-3. Step S230

In step S230, the processor 110 determines whether the margin time T is less than a second time threshold value Tth2. The second time threshold value Tth2 (e.g., about four to five seconds) is smaller than the above-mentioned first time threshold value Tth1. When the margin time T is less than the second time threshold value Tth2 (step S230; Yes), the process proceeds to step S240. Otherwise (step S230; No), the process in this cycle ends. It should be noted that "the margin time T is less than the second time threshold value Tth2" is a first operating condition of the deceleration control.

4-3-4. Step S240

In step S240, the processor 110 searches for a minimal point PM2 of the second risk potential field U2. In particular, the processor 110 searches for the minimal point PM2 in the vicinity of the object 5[i].

The search for the minimal point PM2 will be described with reference to FIG. 24. The processor 110 sets a second search range AS2 as shown in FIG. 24. The second search range AS2 is a range between the position of the object 5[i] and a position away from the object 5[i] by the unit gap Gs[i]. The position of the object 5[i] is obtained from the object information 250. The unit gap Gs[i] is obtained from the potential function information 300. The processor 110 sets the second search range AS2 based on the driving environment information 200 and the potential function information 300.

Further, the processor 110 sets a plurality of checkpoints PC2 in the second search range AS2. The processor 110 calculates the risk value R at each checkpoint PC2 with reference to the second risk potential field U2. By substituting the position of each checkpoint PC2 into the potential function fo constituting the second risk potential field U2, the risk value R at each checkpoint PC2 can be calculated. The minimal point PM2 is the checkpoint PC2 at which the risk value R is minimized.

Thus, the minimal point PM2 is searched for in the second search range AS2 in the vicinity of the object 5[i]. It is not necessary to calculate the risk value R over the entire lane LA to search for the minimal point PM2. Therefore, the calculation load required for searching for the minimal point PM2 is significantly reduced.

4-3-5. Step S250

In step S250, the processor 110 determines whether the minimal point PM2 (that is, the second valley V2) is present in the second search range AS2. When the minimal point PM2 is not present in the second search range AS2 (step S250; No), it means that there is a sufficient distance between the object 5[i] and another object 5[j]. In this case, the processor 110 determines that it is not necessary to execute the deceleration control, and ends the process in this cycle.

When the minimal point PM2 is present in the second search range AS2 (step S250; Yes), it means that there is another object 5[j] near the object 5[i] and the unit gap Gs[i] cannot be secured. In this case, the process proceeds to step S260. It should be noted that "the minimal point PM2 is present in the second search range AS2" is a second operating condition of the deceleration control.

4-3-6. Step S260

In step S260, the processor 110 calculates the suppression amount ΔG[i] for the object 5[i]. Specifically, the processor 110 calculates the lateral distance between the object 5[i] and the minimal point PM2 as the correction gap Gm[i].

Then, the processor 110 calculates the difference between the unit gap Gs[i] and the correction gap Gm[i] as the suppression amount ΔG[i].

4-3-7. Step S270

In step S270, the processor 110 determines whether the suppression amount ΔG[i] is larger than the threshold value Gth. When the suppression amount ΔG[i] is larger than the threshold value Gth (step S270; Yes), the process proceeds to step S280. Otherwise (step S270; No), the process in this cycle ends. "The suppression amount ΔG[i] is larger than the threshold value Gth" is a third operating condition of the deceleration control.

4-3-8. Step S280

In step S280, the processor 110 executes the deceleration control. For example, the processor 110 sets the target deceleration At based on the suppression amount ΔG[i]. In that case, the target deceleration At (absolute value) is set to increase as the suppression amount ΔG[i] increases. A function (e.g., map) showing the correspondence between the suppression amount ΔG[i] and the target deceleration At is generated in advance. The processor 110 calculates the target deceleration At in accordance with the suppression amount ΔG[i] by referring to the function.

Then, the processor 110 executes the deceleration control according to the target deceleration At. The speed of the vehicle 1 is obtained from the vehicle state information 220. The processor 110 controls the braking device 33 such that the target deceleration At is realized.

4-4. Process When a Plurality of Minimal Points is Present

As described above, the second valley V2 (minimal point PM2) of the second risk potential field U2 for the deceleration control is searched for in the second search range AS2. At this time, there is a possibility that a plurality of the minimal points PM2 is found in the second search range AS2. For convenience, the minimal points PM2 in the second search range AS2 are referred to as "minimal point candidates CM2".

When an inappropriate minimal point candidate CM2 is selected from the minimal point candidates CM2 as the minimal point PM2, the suppression amount ΔG[i] becomes inappropriate, and as a result, an inappropriate risk avoidance control is to be executed. The occupant of the vehicle 1 (typically the driver) feels uncomfortable with the inappropriate risk avoidance control. In order to realize the risk avoidance control with less sense of discomfort, it is important to select an appropriate minimal point PM2 from the minimal point candidates CM2.

Figure 25:
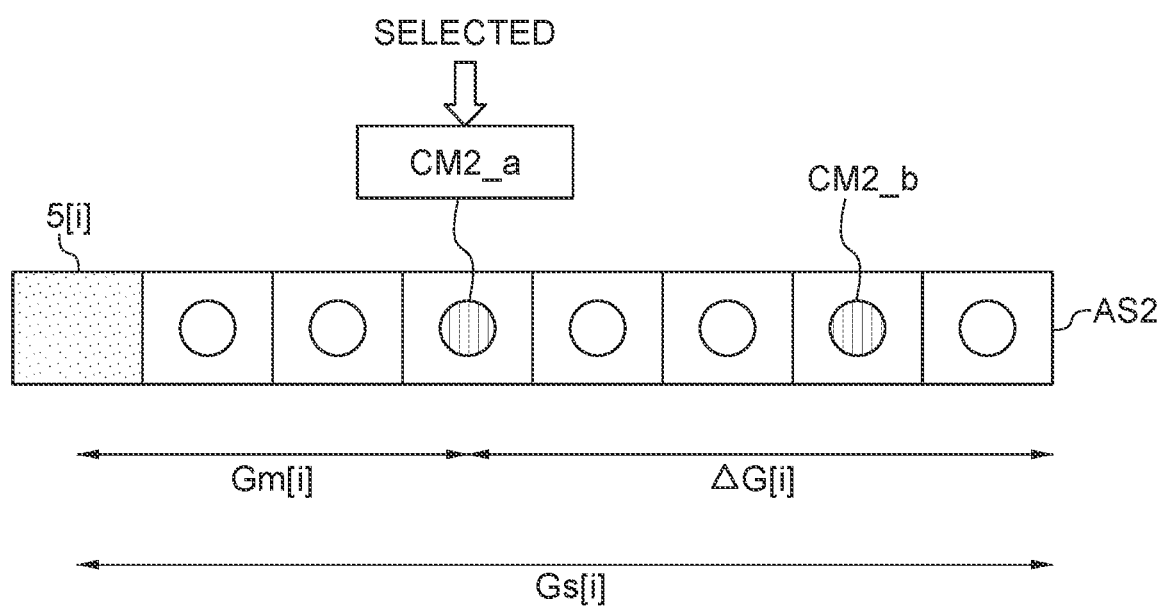
FIG. 25 is a conceptual diagram illustrating a method of selecting an appropriate minimal point from a plurality of minimal point candidates according to the embodiment of the present disclosure.

FIG. 25 is a conceptual diagram for explaining a method of selecting an appropriate minimal point PM2 from the minimal point candidates CM2. In the example shown in FIG. 25, two minimal point candidates CM2_a, CM2_b are present in the second search range AS2. The object 5 [i] is the object 5 that is the subject of the deceleration control. The minimal point candidate CM2_a is close to the object 5 [i], and the minimal point candidate CM2_b is away from the object 5 [i].

When the minimal point candidate CM2_b that is away from the object 5 [i] is selected as the minimal point PM2 although the minimal point candidate CM2_a that is close to the object 5 [i] is present, the correction gap Gm [i] becomes too large. In other words, the suppression amount ΔG [i] is underestimated. When the suppression amount ΔG [i] is underestimated, the deceleration control is not sufficiently executed. The occupant of the vehicle 1 feels uncomfortable and uneasy due to an insufficient deceleration control.

Therefore, the processor 110 selects the minimal point candidate CM2_a as the minimal point PM2. Generally speaking, the processor 110 selects, from the minimal point candidates CM2, the minimal point candidate CM2 that is the closest to the object 5 [i] as the minimal point PM2. As a result, the appropriate suppression amount ΔG [i] can be obtained, and the deceleration control can be appropriately executed. That is, it is possible to suppress a sense of discomfort and a sense of uneasiness with respect to the risk avoidance control (steering control) based on the second risk potential field U2.

4-5. Effect

As described above, according to the present embodiment, the second risk potential field U2 is applied to the deceleration control of the risk avoidance control. Specifically, the minimal point PM2 (second valley V2) of the second risk potential field U2 is searched for, and the suppression amount ΔG [i] is calculated based on the positional relationship between the minimal point PM2 and the object 5 [i]. The suppression amount ΔG [i] is then used as a criterion for determining whether to execute the deceleration control.

The minimal point PM2 is searched for in the second search range AS2 in the vicinity of the object 5[i]. When the minimal point PM2 is not present in the second search range AS2, the correction gap Gm[i] and the suppression amount ΔG[i] are not calculated because the deceleration control does not need to be executed. As a result, the calculation load is reduced.

When the minimal point candidates CM2 are present in the second search range AS2, the minimal point candidate CM2 that is the closest to the object 5 [i] is selected from the minimal point candidates CM2 as the minimal point PM2. As a result, the appropriate suppression amount ΔG [i] can be obtained, and the deceleration control can be appropriately executed. That is, it is possible to suppress a sense of discomfort and a sense of uneasiness with respect to the risk avoidance control (steering control) based on the second risk potential field U2.

The second risk potential field U2 may include only the obstacle potential field Uo[i]. In this case, the position of the minimal point PM2 is determined only based on the positional relationship of the object 5 [i]. The suppression amount ΔG[i] is calculated based on the minimal point PM2 described above, whereby an appropriate suppression amount ΔG[i] incorporating the proximity situation of the object 5[i] can be obtained. As a result, an unnecessary deceleration control or an excessive deceleration control is suppressed. Thus, a sense of discomfort felt by the occupant of the vehicle 1 is suppressed.

5. Combination of Steering Control and Deceleration Control

A combination of the steering control and the deceleration control is also possible. The first risk potential field U1 is applied to the steering control, and the second risk potential field U2 is applied to the deceleration control. This provides both the effects described in Section 3 and the effects described in Section 4.

What is claimed is:

1. A driving support system that supports driving of a vehicle, the driving support system comprising:
 a storage device that stores driving environment information indicating a driving environment of the vehicle; and
 a processor that executes a risk avoidance control for reducing a risk of collision with an object in front of the vehicle, based on the driving environment information, wherein:
 a risk potential field represents a risk value as a function of position;
 a vertical potential field is the risk potential field in which a valley of the risk value extends in a lane longitudinal direction;
 an obstacle potential field is the risk potential field in which the risk value is maximum at a position of the object and decreases as a distance from the object increases;
 the risk avoidance control includes a steering control for steering the vehicle;
 the risk avoidance control includes a deceleration control for decelerating the vehicle;
 a first risk potential field for the steering control is a sum of the vertical potential field and the obstacle potential field;
 a second risk potential field for the deceleration control includes at least the obstacle potential field;
 the processor is configured to repeatedly execute
  a process of setting the first risk potential field based on the driving environment information,
  a second process of setting the second risk potential field based on the driving environment information,
  a search process of searching for a first minimum point that is a minimum point of the first risk potential field in a first search range that intersects a traveling direction of the vehicle,
  the steering control for steering the vehicle so as to approach the first minimum point,
  a second search process of searching for a minimal point of the second risk potential field in a second search range, the second search range is a range between the position of the object and a position away from the object by a predetermined gap,
  the deceleration control based on a positional relationship between the minimal point and the object, and
  when a plurality of the minimal points is present in the second search range, select a minimal point that is the closest to the object from the minimal points as the minimal point;
 a previous minimum point is the first minimum point in a previous cycle; and
 a foremost object is the object that is present in front of the vehicle and is the closest to the vehicle, and when a plurality of candidates for the first minimum point is present in the first search range, the processor selects, as a current first minimum point, the candidate that is present in a direction away from the foremost object as viewed from the previous minimum point and is the closest to the previous minimum point.

2. The driving support system according to claim 1, wherein:
 the processor sets a forward gaze point at a position in front of the vehicle by a first distance along the traveling direction of the vehicle;
 the first search range is a range extending in a lane width direction from the forward gaze point; and
 the processor calculates a first deviation that is a deviation in the lane width direction between the forward gaze point and the first minimum point, and executes the steering control such that the first deviation is reduced.

3. The driving support system according to claim 1, wherein:
 the vertical potential field is a vehicle center potential field in which the valley of the risk value extends in the lane longitudinal direction from a position of the vehicle; and
 a position of the valley in the vehicle center potential field changes in conjunction with the position of the vehicle.

4. The driving support system according to claim 1, wherein when a correction gap that is a lateral distance between the object and the minimal point is smaller than the predetermined gap, and a difference between the predetermined gap and the correction gap is larger than a threshold value, the processor executes the deceleration control.

5. The driving support system according to claim 1, wherein the processor sets the second risk potential field by superimposing only the obstacle potential field set for the object without using the vertical potential field.

* * * * *